(12) United States Patent
Hirakata

(10) Patent No.: US 10,279,576 B2
(45) Date of Patent: May 7, 2019

(54) PEELING METHOD AND MANUFACTURING METHOD OF FLEXIBLE DEVICE

(71) Applicant: Semiconductor Energy Laboratory Co., Ltd., Atsugi-shi, Kanagawa-ken (JP)

(72) Inventor: Yoshiharu Hirakata, Tochigi (JP)

(73) Assignee: Semiconductor Energy Laboratory Co., Ltd., Kanagawa-ken (JP)

(*) Notice: Subject to any disclaimer, the term of this patent is extended or adjusted under 35 U.S.C. 154(b) by 45 days.

(21) Appl. No.: 15/490,082

(22) Filed: Apr. 18, 2017

(65) Prior Publication Data

US 2017/0305134 A1 Oct. 26, 2017

(30) Foreign Application Priority Data

Apr. 26, 2016 (JP) .................... 2016-088083
Apr. 26, 2016 (JP) .................... 2016-088302

(51) Int. Cl.
*B32B 43/00* (2006.01)
*B32B 27/08* (2006.01)
(Continued)

(52) U.S. Cl.
CPC ............ *B32B 43/006* (2013.01); *B32B 27/08* (2013.01); *B32B 37/12* (2013.01); *B32B 38/10* (2013.01); *B32B 2379/08* (2013.01); *B32B 2457/00* (2013.01); *Y10T 156/1132* (2015.01); *Y10T 156/1158* (2015.01); *Y10T 156/1184* (2015.01); *Y10T 156/1917* (2015.01);
(Continued)

(58) Field of Classification Search
CPC . B32B 38/10; B32B 43/006; Y10T 156/1132; Y10T 156/1158; Y10T 156/1184; Y10T 156/1917; Y10T 156/1944; Y10T 156/1961; Y10T 156/1967
USPC ....... 156/707, 712, 717, 753, 758, 761, 762, 156/924
See application file for complete search history.

(56) References Cited

U.S. PATENT DOCUMENTS 9,088,006 B2  7/2015 Yamazaki et al.
9,333,736 B2  5/2016 Kumakura et al.
(Continued)

FOREIGN PATENT DOCUMENTS

JP  2014-197522 A  10/2014

*Primary Examiner* — Mark A Osele
*Assistant Examiner* — Nickolas R Harm
(74) *Attorney, Agent, or Firm* — Robinson Intellectual Property Law Office; Eric J. Robinson

(57) ABSTRACT

A peeling method is provided. In a first step, a resin layer is formed over a support substrate, openings are formed along two opposite sides of a periphery of the resin layer in a top view, an element layer is formed over the resin layer and positioned on an inner side than the openings in the top view, and the support substrate and a counter substrate are bonded to each other so that an adhesive layer is in contact with the support substrate in the openings, thereby forming a process member. In a second step, an entire surface of the process member is irradiated with light from the support substrate side. In a third step, a blade is inserted into an end portion of the process member from an interface between the support substrate and the resin layer or from the resin layer, and is made to pass through the openings.

23 Claims, 23 Drawing Sheets

(51) Int. Cl.
*B32B 37/12* (2006.01)
*B32B 38/10* (2006.01)

(52) U.S. Cl.
CPC .... *Y10T 156/1944* (2015.01); *Y10T 156/1961* (2015.01); *Y10T 156/1967* (2015.01)

(56) References Cited

U.S. PATENT DOCUMENTS

| | | |
|---|---|---|
| 9,437,832 B2 | 9/2016 | Sakuishi et al. |
| 9,466,811 B2 | 10/2016 | Sakuishi |
| 9,627,648 B2 | 4/2017 | Yamazaki et al. |
| 9,682,544 B2 | 6/2017 | Kumakura et al. |
| 9,899,626 B2* | 2/2018 | Nakada ............... H01L 51/5246 |
| 9,905,589 B2* | 2/2018 | Yamazaki ........... H01L 27/1266 |
| 9,937,698 B2* | 4/2018 | Yasumoto ............. B32B 43/006 |
| 2011/0233585 A1* | 9/2011 | Kojima ................ H01L 33/486 257/98 |
| 2011/0318889 A1* | 12/2011 | Chida ............... H01L 21/02554 438/158 |
| 2015/0008579 A1* | 1/2015 | Mizusawa ........... H01L 23/3114 257/737 |
| 2015/0044792 A1 | 2/2015 | Aoyama et al. |
| 2015/0075720 A1 | 3/2015 | Hirakata et al. |
| 2015/0123106 A1 | 5/2015 | Yasumoto et al. |
| 2015/0156880 A1* | 6/2015 | Daizo .................... H05K 1/183 174/251 |
| 2015/0165477 A1 | 6/2015 | Yamazaki et al. |
| 2015/0319893 A1 | 11/2015 | Ohno et al. |
| 2016/0239124 A1 | 8/2016 | Chida |
| 2017/0025638 A1 | 1/2017 | Sakuishi |
| 2017/0092885 A1 | 3/2017 | Sakuishi et al. |
| 2017/0186829 A1 | 6/2017 | Yamazaki et al. |

* cited by examiner

FIG. 1A1
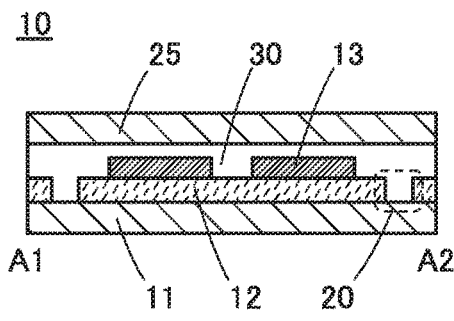
FIG. 1A2
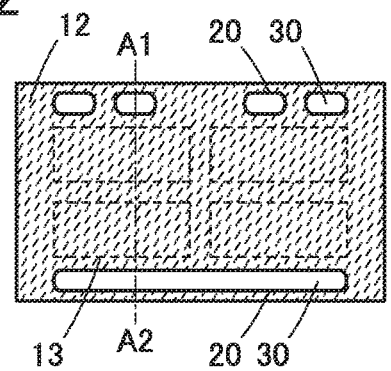
FIG. 1B1
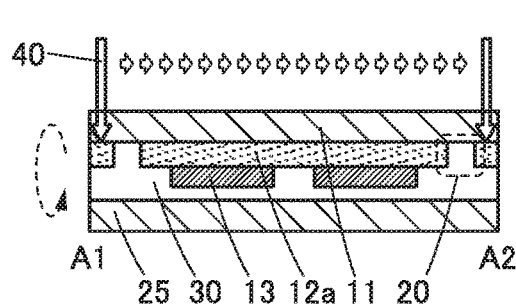
FIG. 1B2
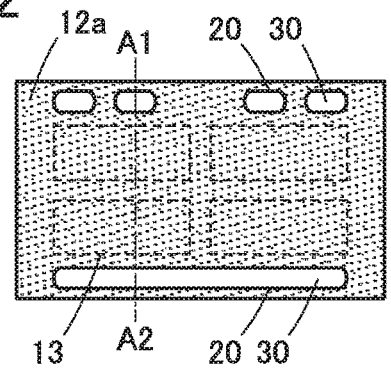
FIG. 1C1
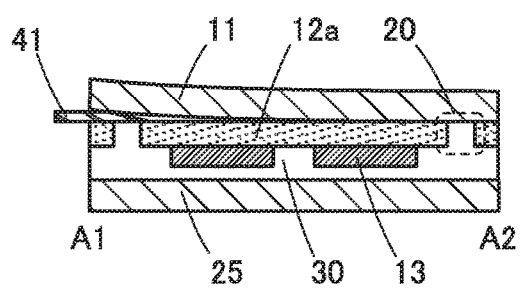
FIG. 1C2
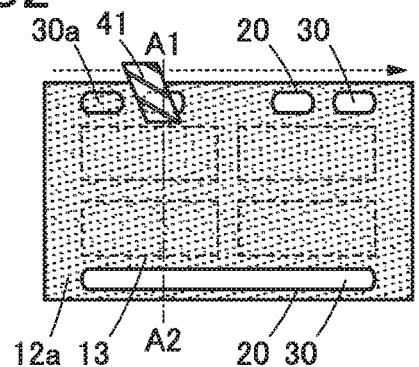
FIG. 1D1
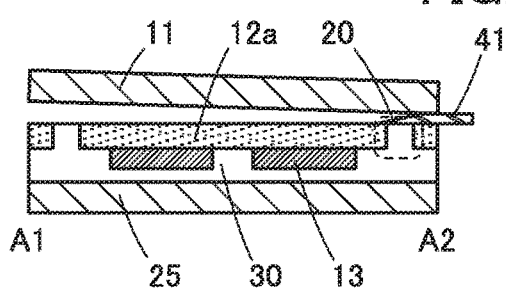
FIG. 1D2
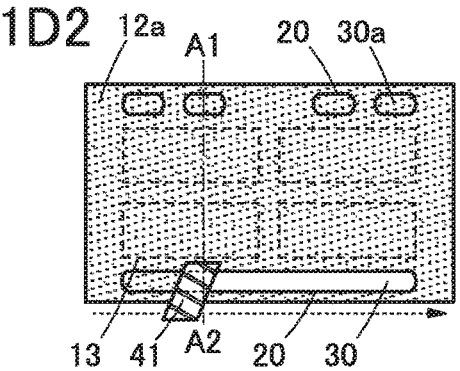

FIG. 2A1
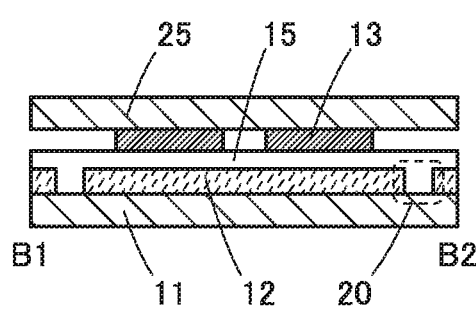
FIG. 2A2
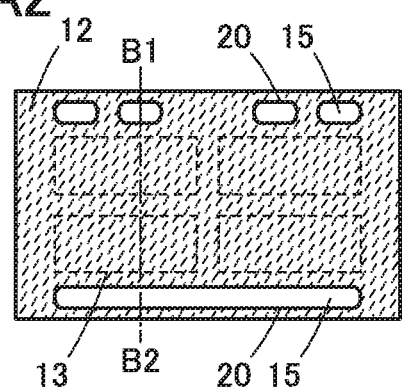
FIG. 2B1
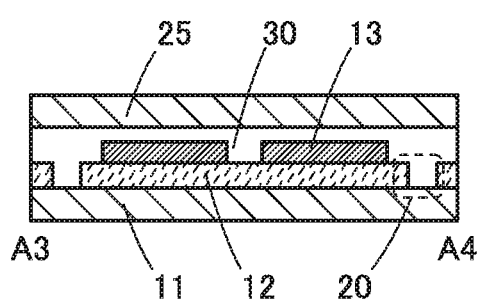
FIG. 2B2
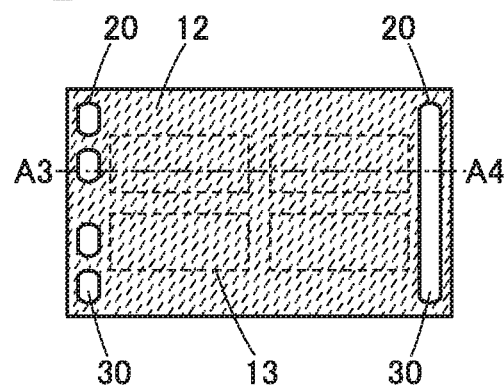

FIG. 3A1
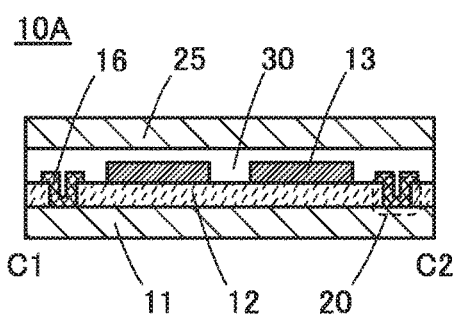
FIG. 3A2
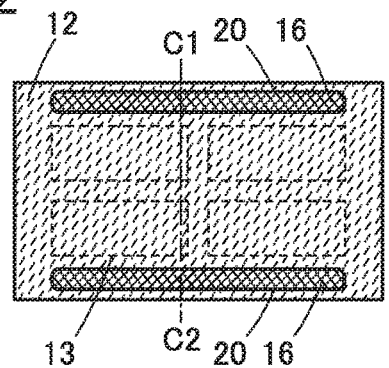
FIG. 3B1
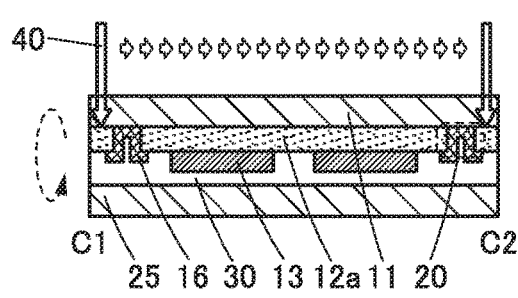
FIG. 3B2
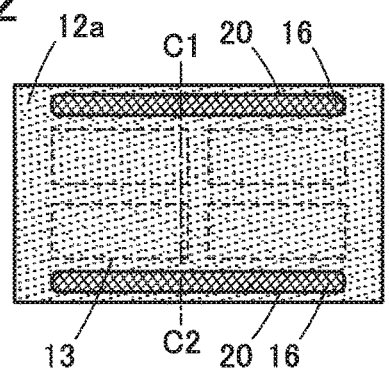
FIG. 3C1
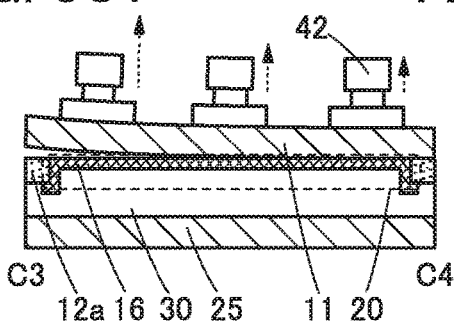
FIG. 3C2
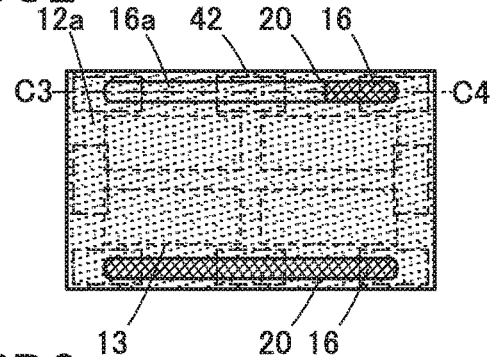
FIG. 3D1
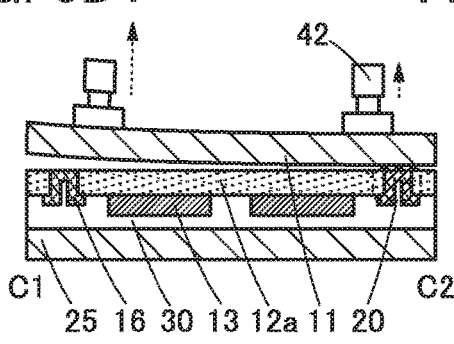
FIG. 3D2
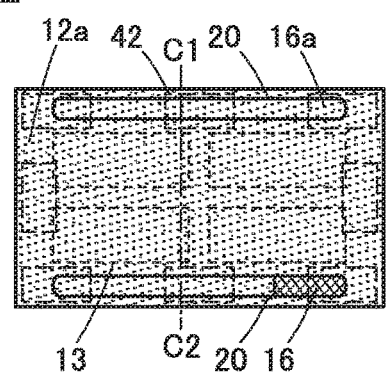

FIG. 4A1 FIG. 4A2
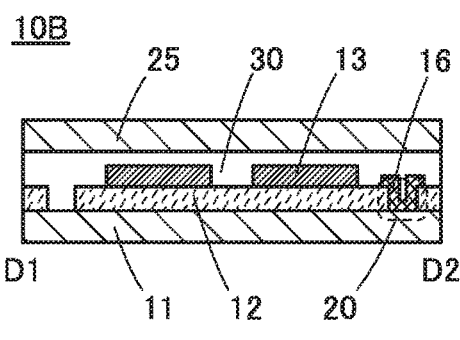
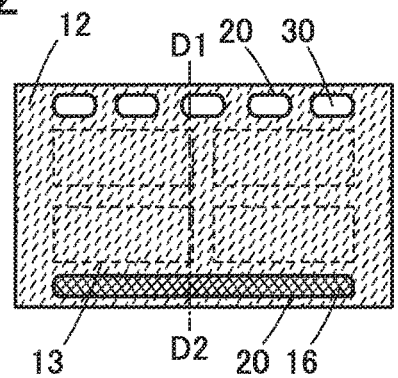
FIG. 4B1 FIG. 4B2
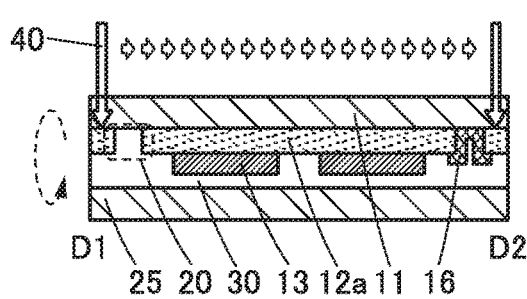
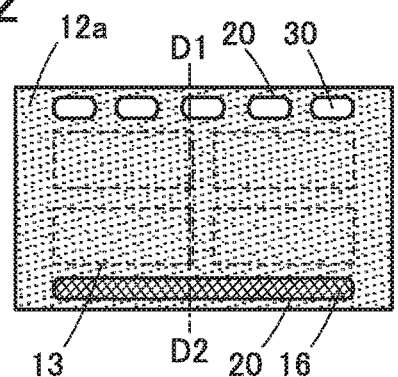
FIG. 4C1 FIG. 4C2
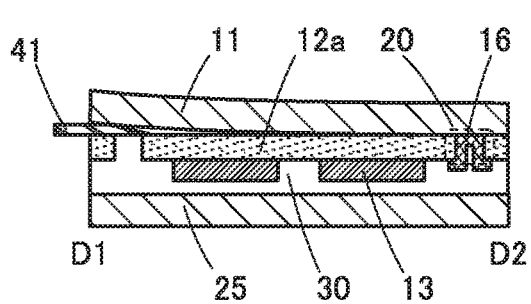
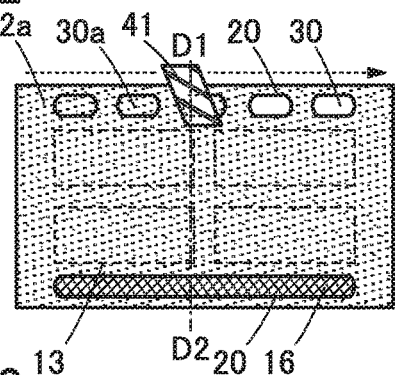
FIG. 4D1 FIG. 4D2
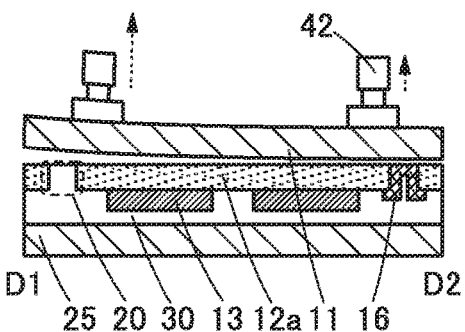
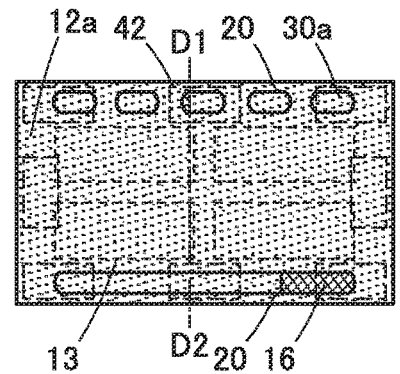

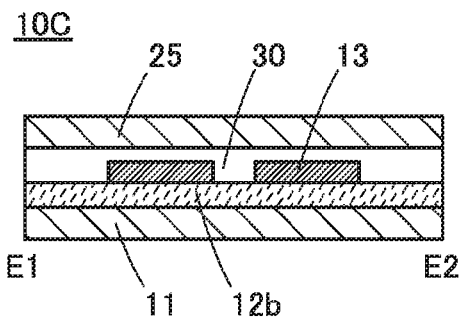# FIG. 5A1
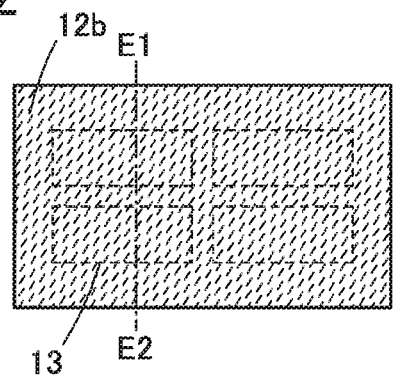# FIG. 5A2
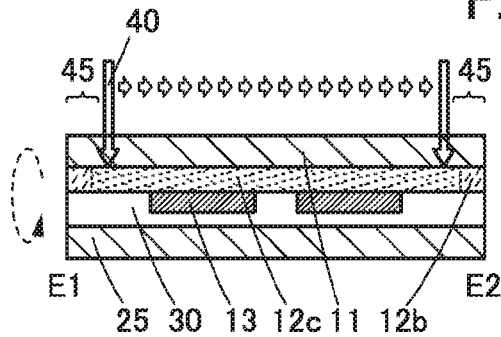# FIG. 5B1
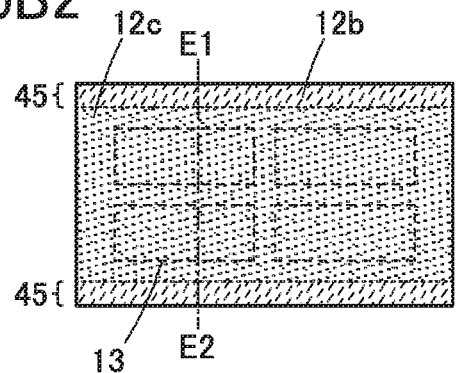# FIG. 5B2
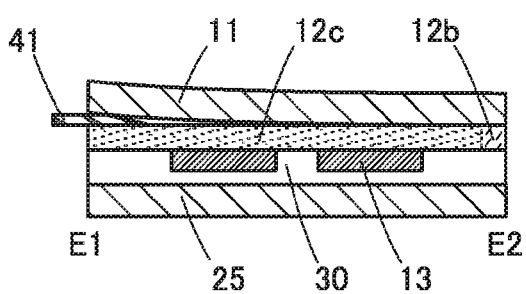# FIG. 5C1
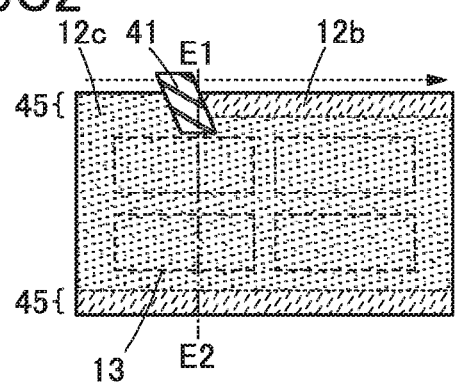# FIG. 5C2
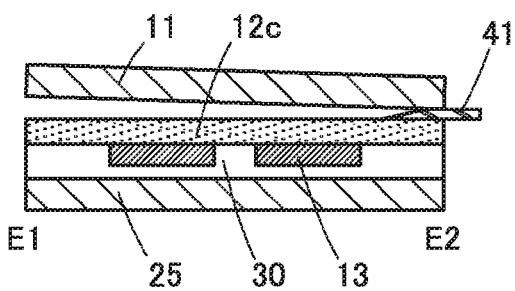# FIG. 5D1
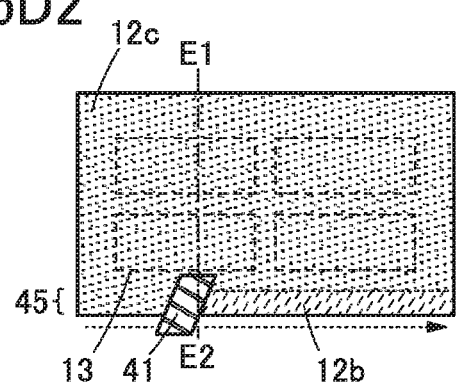# FIG. 5D2

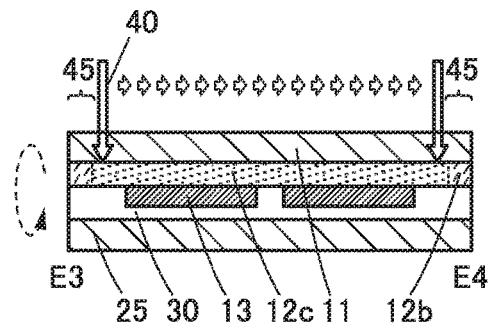
FIG. 6A1
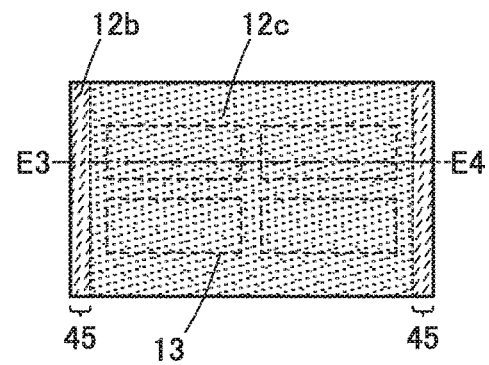
FIG. 6A2
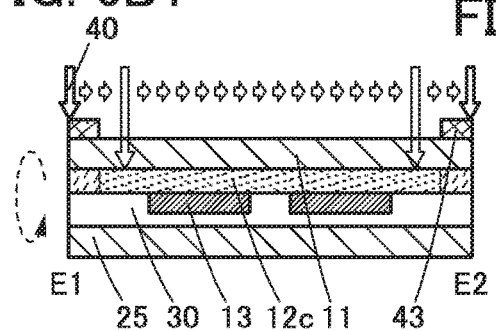
FIG. 6B1
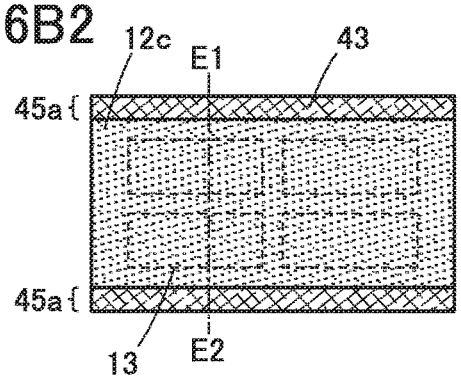
FIG. 6B2
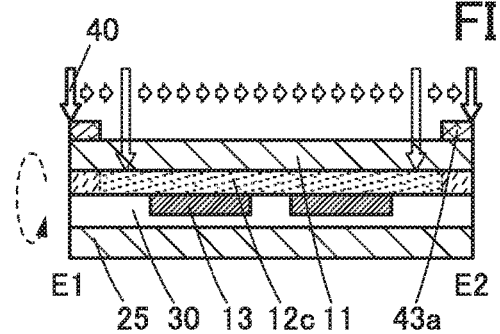
FIG. 6C1
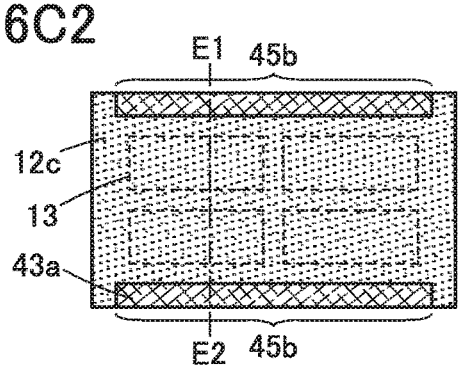
FIG. 6C2

FIG. 7A1
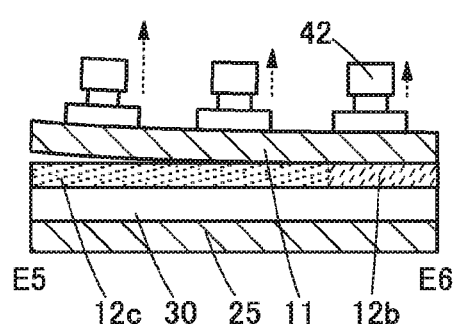
FIG. 7A2
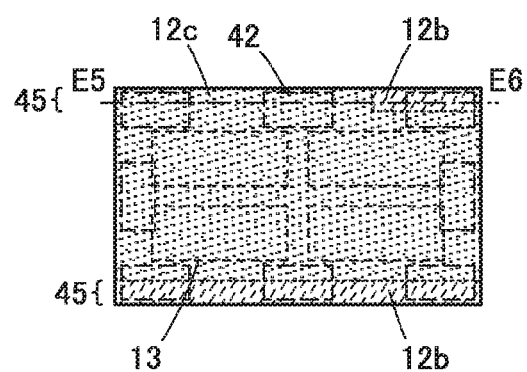
FIG. 7B1
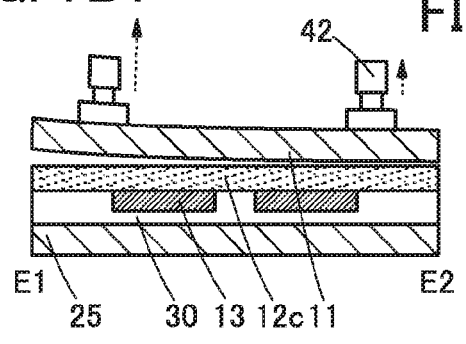
FIG. 7B2
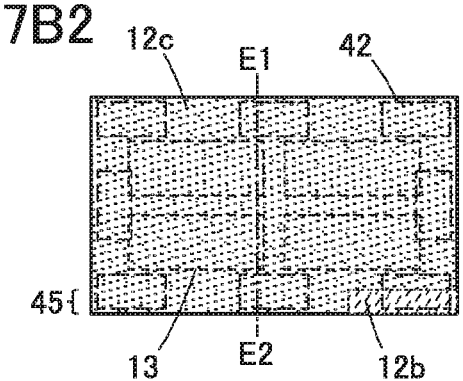

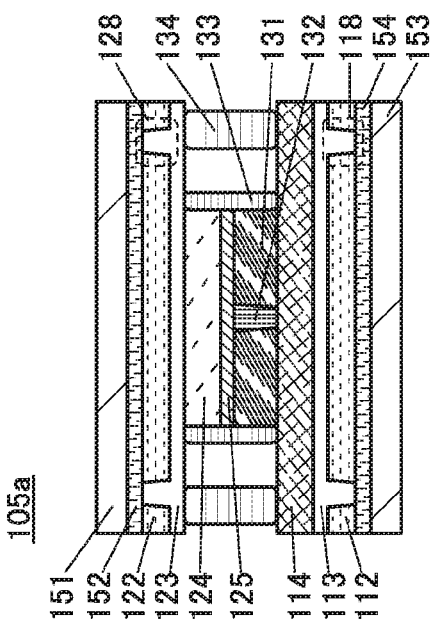
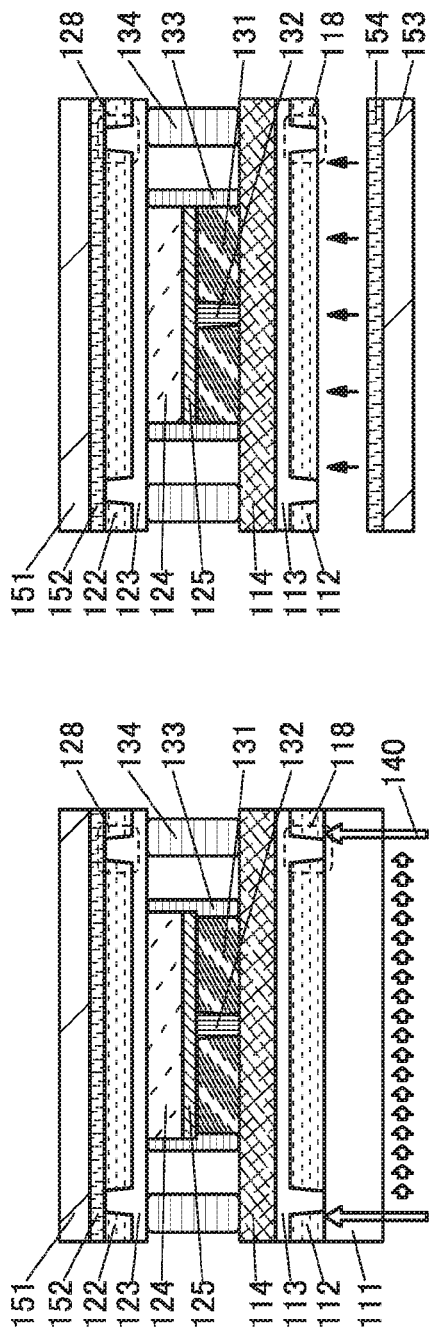
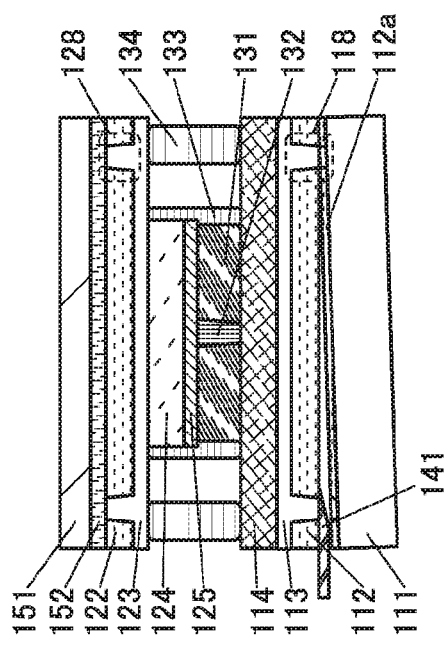

FIG. 13A
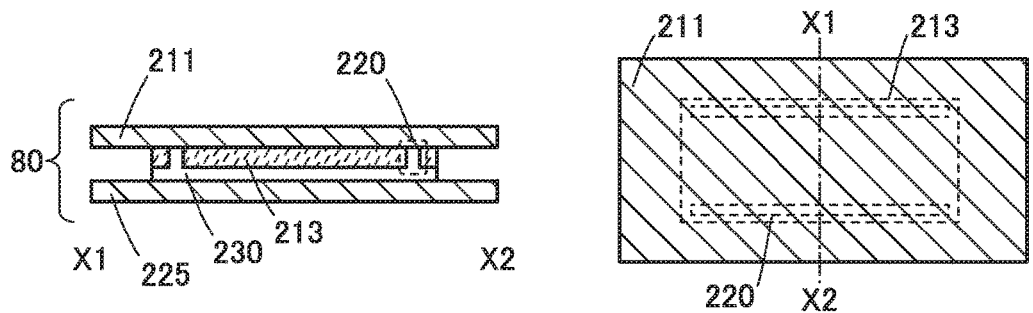
FIG. 13B
FIG. 13C
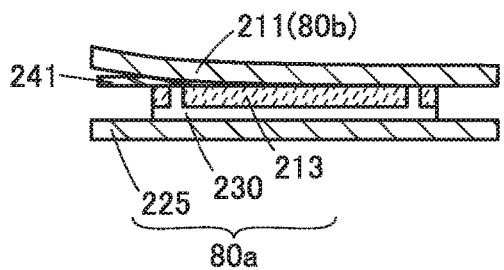
FIG. 13D
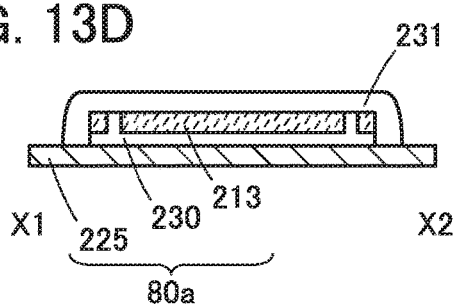
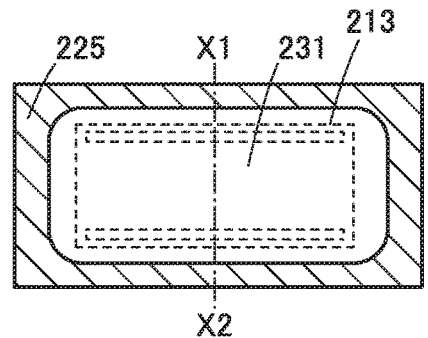
FIG. 13E
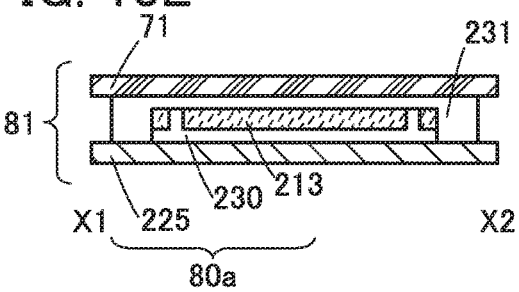
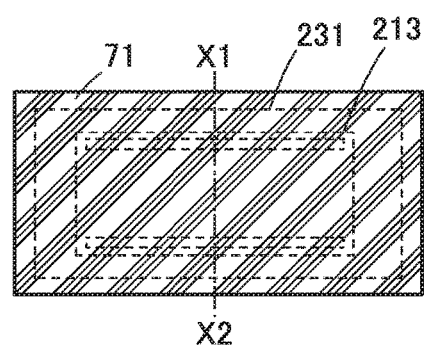

FIG. 14A
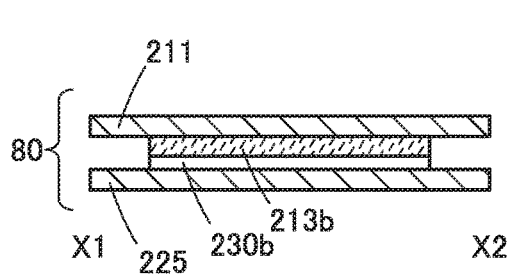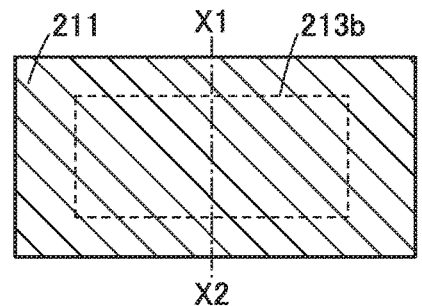
FIG. 14B
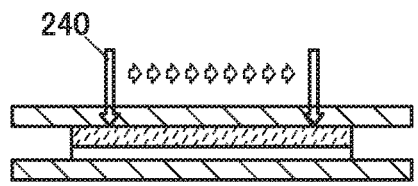
FIG. 14C
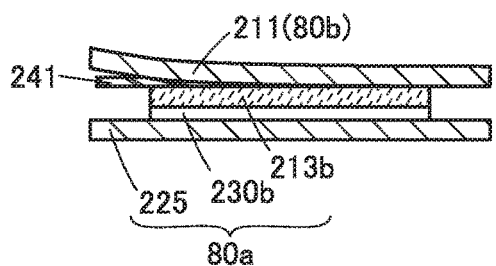
FIG. 14D
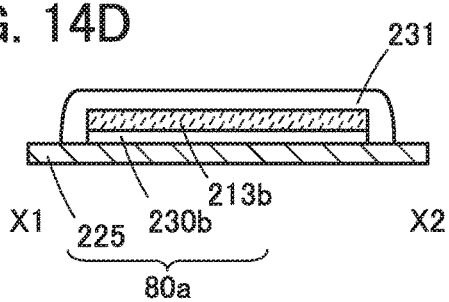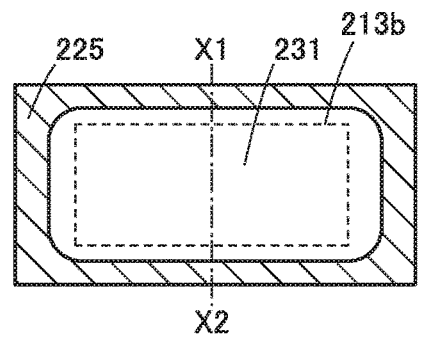
FIG. 14E
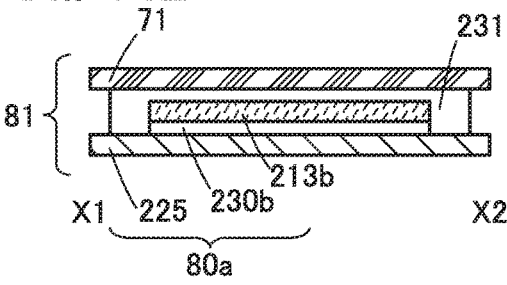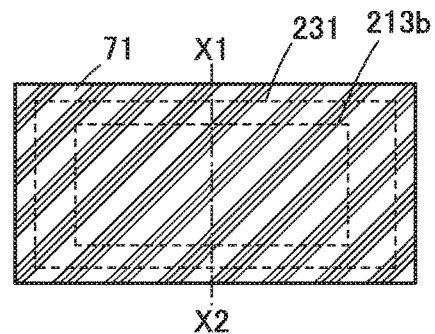

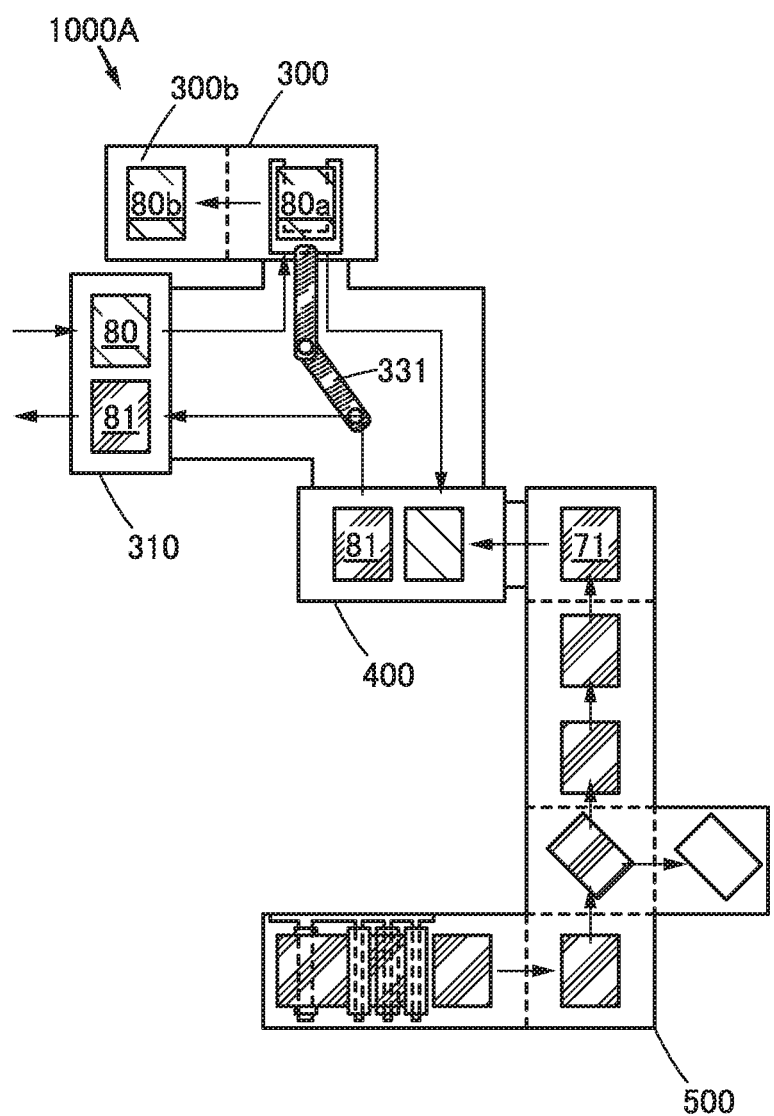

FIG. 17A
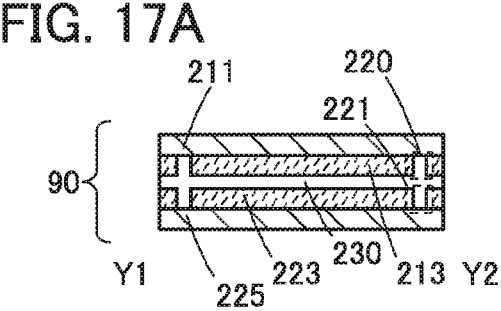 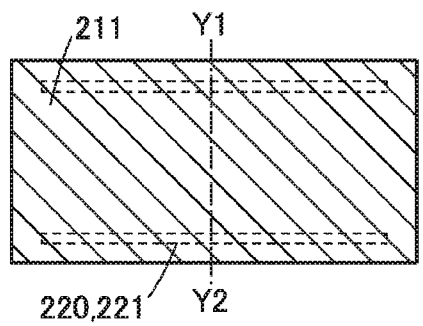
FIG. 17B
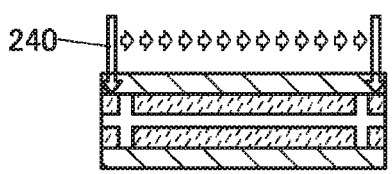
FIG. 17C
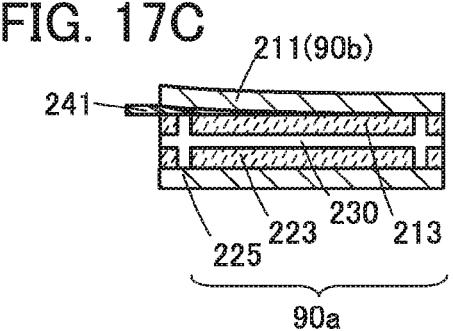
FIG. 17D
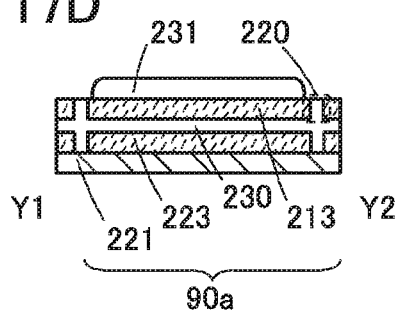 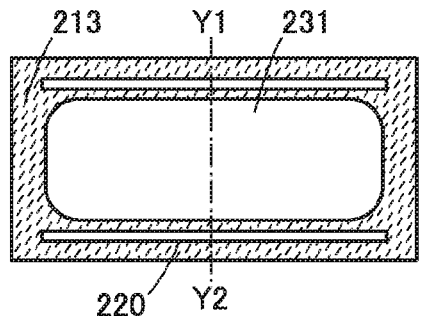
FIG. 17E
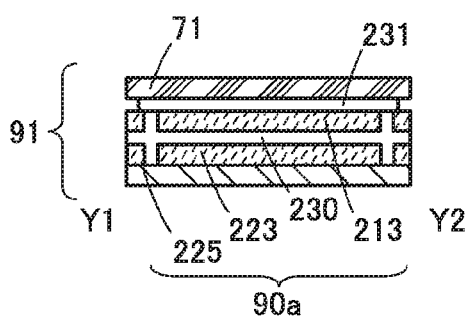 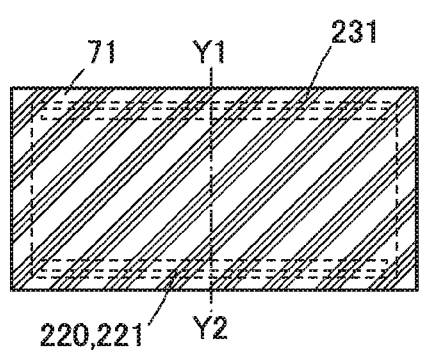

FIG. 18A
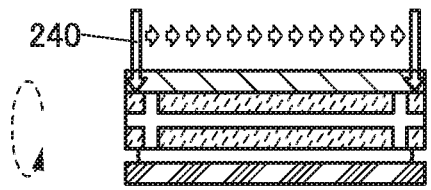
FIG. 18B
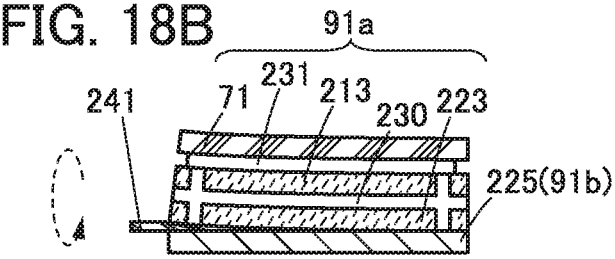
FIG. 18C
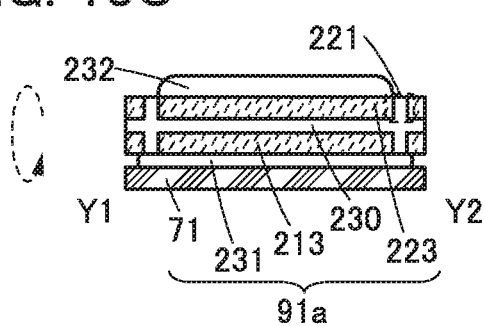 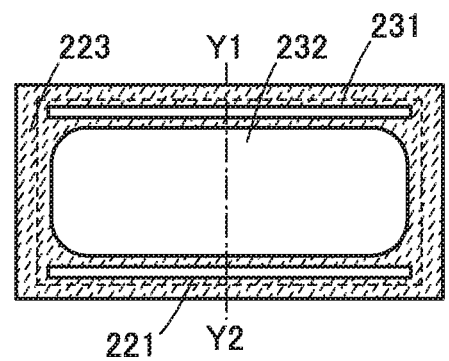
FIG. 18D
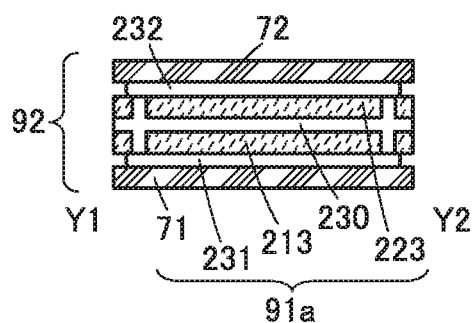 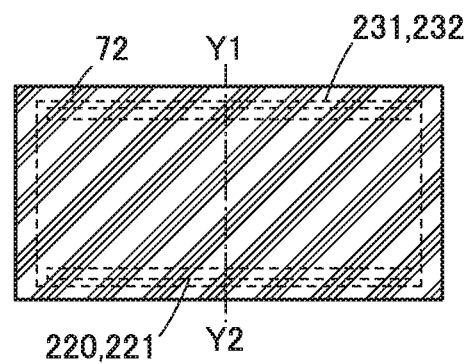

FIG. 19A
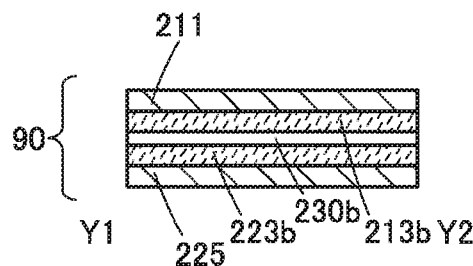
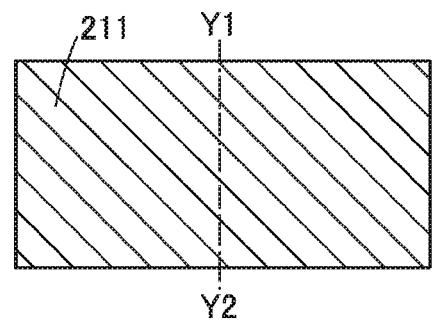
FIG. 19B
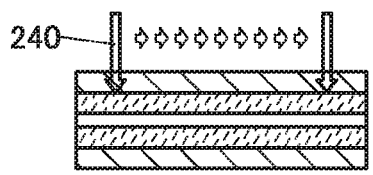
FIG. 19C
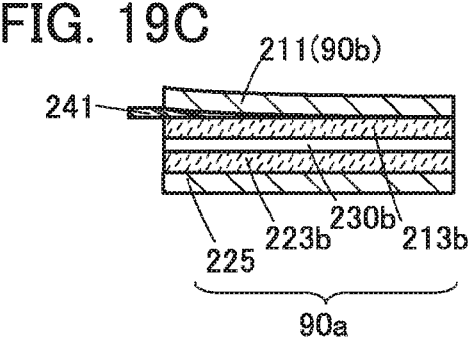
FIG. 19D
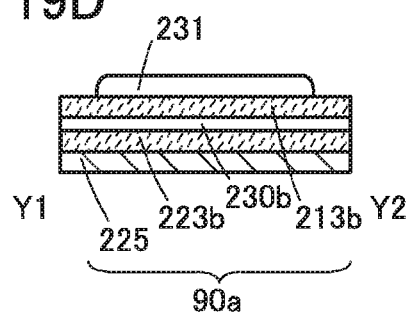
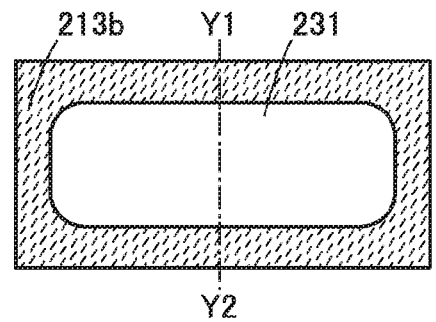
FIG. 19E
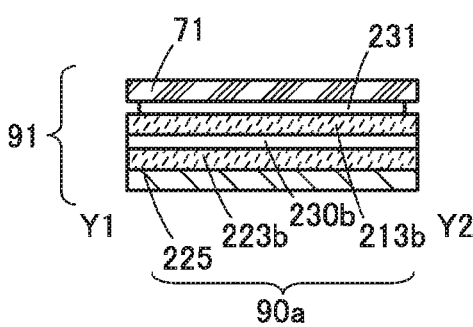
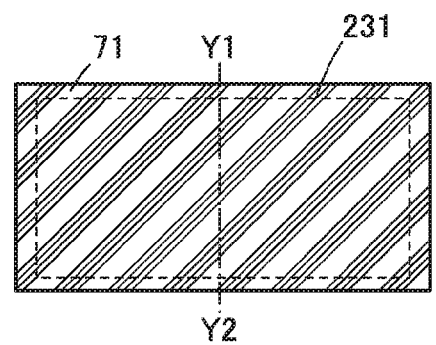

FIG. 20A
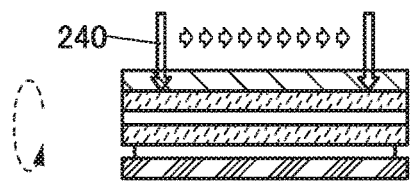
FIG. 20B
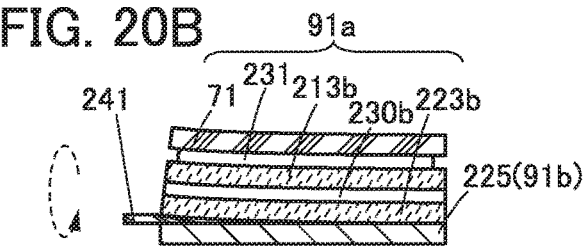
FIG. 20C
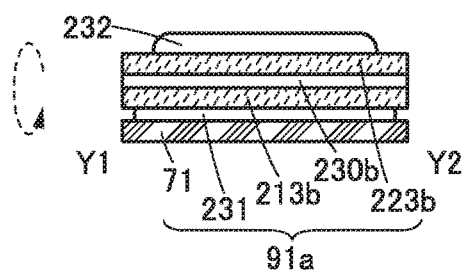
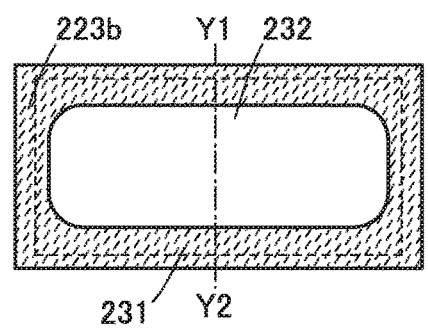
FIG. 20D
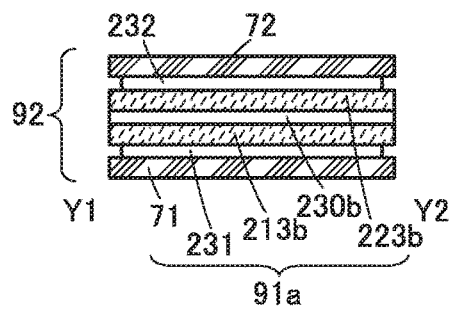
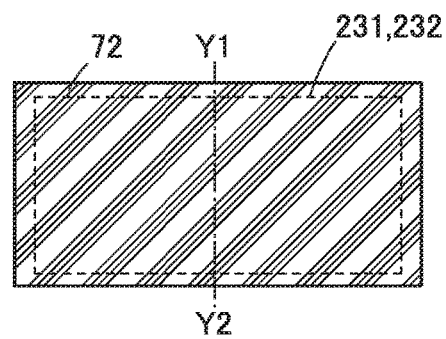

PEELING METHOD AND MANUFACTURING METHOD OF FLEXIBLE DEVICE

BACKGROUND OF THE INVENTION

1. Field of the Invention

One embodiment of the present invention relates to a peeling method and a method for manufacturing a flexible device.

Note that one embodiment of the present invention is not limited to the above technical field. Examples of the technical field of one embodiment of the present invention include a semiconductor device, a display device, a light-emitting device, a power storage device, a memory device, an electronic device, a lighting device, an input device (such as a touch sensor), an input/output device (such as a touch panel), a driving method thereof, and a manufacturing method thereof.

In this specification and the like, the semiconductor device indicates all the devices that can function by utilizing semiconductor characteristics. A transistor, a semiconductor circuit, an arithmetic device, a memory device, and the like are each an embodiment of the semiconductor device. An arithmetic device, a memory device, an imaging device, an electro-optical device, a power generation device (e.g., a thin film solar cell and an organic thin film solar cell), and an electronic appliance each may include a semiconductor device.

2. Description of the Related Art

Display devices using organic electroluminescent (EL) elements or liquid crystal elements have been known. Examples of the display device also include a light-emitting device provided with a light-emitting element such as a light-emitting diode (LED), and electronic paper performing display with an electrophoretic method or the like.

The organic EL element generally has a structure in which a layer containing a light-emitting organic compound is provided between a pair of electrodes. By voltage application to this element, the light-emitting organic compound can emit light. A display device including such an organic EL element can be thin and lightweight and have high contrast and low power consumption.

Patent Document 1 discloses a flexible light-emitting device in which an organic EL element is used.

REFERENCE

Patent Document

[Patent Document 1] Japanese Published Patent Application No. 2014-197522

SUMMARY OF THE INVENTION

Flexible devices typified by flexible displays can be obtained by forming semiconductor elements such as transistors, and other elements over flexible substrates (films). However, flexible substrates have lower heat resistance than glass substrates or the like. Thus, when transistors or the like are directly formed on flexible substrates, the electrical characteristics and reliability of the transistors cannot be improved in some cases.

Thus, a method described in Patent Document 1 in which a semiconductor element, a light-emitting element, or the like formed over a glass substrate over which a peeling layer is formed is peeled and transferred to a flexible substrate has been considered. In this method, the formation temperature of the semiconductor element can be increased; thus, an extremely highly reliable flexible device can be manufactured.

An object of one embodiment of the present invention is to provide a novel peeling method. An object of one embodiment of the present invention is to provide a peeling method which achieves high mass productivity with low cost. An object of one embodiment of the present invention is to perform peeling with the use of a large substrate.

An object of one embodiment of the present invention is to provide a novel method for manufacturing a flexible device. An object of one embodiment of the present invention is to provide a highly reliable flexible device. An object of one embodiment of the present invention is to manufacture a flexible device at low temperatures. An object of one embodiment of the present invention is to provide a method for manufacturing a flexible device with a simplified manufacturing process. An object of one embodiment of the present invention is to provide a method for manufacturing a flexible device with high productivity at low cost. Ab object of one embodiment of the present invention is to manufacture a flexible device with the use of a large substrate.

Note that the descriptions of these objects do not disturb the existence of other objects. Note that one embodiment of the present invention does not necessarily achieve all the objects. Other objects can be derived from the description of the specification, the drawings, and the claims.

One embodiment of the present invention is a peeling method including a first step of preparing a process member including a support substrate, a resin layer, an element layer, a first adhesive layer, and a counter substrate; a second step of irradiating the process member with light; and a third step of inserting a blade into the process member and peeling the support substrate from the process member. In the first step, the resin layer is formed over the support substrate, openings are formed along two opposite sides of a periphery of the resin layer in a top view, the element layer is formed over the resin layer to be positioned on an inner side than the openings in the top view, and the support substrate and the counter substrate are bonded to each other so that the first adhesive layer is in contact with the support substrate in the openings. In the second step, the light is light from a laser light source, and an entire surface of the process member is irradiated with the light from the support substrate side. In the third step, the blade is inserted into an end portion of the process member from an interface between the support substrate and the resin layer or from the resin layer, and the blade is made to pass through the openings.

Another embodiment of the present invention is the above-described peeling method in which the openings are positioned on an inner side than the end portion of the resin layer in the top view.

Another embodiment of the present invention is a peeling method including a first step of preparing a process member including a support substrate, a resin layer, a first layer, an element layer, a first adhesive layer, and a counter substrate; a second step of irradiating the process member with light; and a third step of peeling the support substrate from the process member. In the first step, the resin layer is formed over the support substrate, openings are formed along two opposite sides of a periphery of the resin layer in a top view, the element layer is formed over the resin layer to be positioned on an inner side than the openings in the top view, the first layer is formed over the support substrate to cover the openings, and the support substrate and the counter substrate are bonded to each other so that the first adhesive layer is in contact with the first layer in the openings. In the second step, the light is light from a laser light source, and an entire surface of the process member is irradiated with the light from the support substrate side. In the third step, the counter substrate is fixed to a stage, the support substrate is held by a plurality of suction pads, and the plurality of suction pads is lifted up, so that the support substrate is peeled from the process member.

Another embodiment of the present invention is the above-described peeling method in which the first layer includes indium tin oxide or In—Ga—Zn oxide.

Another embodiment of the present invention is a peeling method including a first step of preparing a process member including a support substrate, a resin layer, an element layer, an adhesive layer, and a counter substrate; a second step of irradiating the process member with light; and a third step of inserting a blade into the process member and peeling the support substrate from the process member. In the first step, the resin layer is formed over the support substrate, the element layer is formed over the resin layer, and the counter substrate is positioned over the resin layer and the element layer with the adhesive layer positioned therebetween. In the second step, the light is light from a laser light source, the process member is irradiated with the light from the support substrate side, and an entire surface of the process member except regions along two opposite sides of a periphery of the process member in a top view is irradiated with the light. In the third step, the blade is inserted into an end portion of the process member from an interface between the support substrate and the resin layer or from a side surface of the resin layer, and the blade is made to pass through the regions.

Another embodiment of the present invention is a peeling method including a first step of preparing a process member including a support substrate, a resin layer, an element layer, an adhesive layer, and a counter substrate; a second step of irradiating the process member with light; and a third step of inserting a blade into the process member and peeling the support substrate from the process member. In the first step, the resin layer is formed over the support substrate, the element layer is formed over the resin layer, and the counter substrate is positioned over the resin layer and the element layer with the adhesive layer positioned therebetween. In the second step, a light-blocking film is provided over the support substrate, the light-blocking film covers regions along two opposite sides of a periphery in a top view, the light is light from a laser light source, and an entire surface the process member is irradiated with the light from the support substrate side. In the third step, the blade is inserted into an end portion of the process member from an interface between the support substrate and the resin layer or from a side surface of the resin layer, and the blade is made to pass through the regions.

Another embodiment of the present invention is the above-described peeling method in which in the second step, the light-blocking film covers the periphery except end portions of the two opposite sides in the top view.

Another embodiment of the present invention is the above-described peeling method in which the resin layer includes a photosensitive material.

Another embodiment of the present invention is the above-described peeling method in which the resin layer has a thickness of greater than or equal to 0.1 μm and less than or equal to 3 μm.

Another embodiment of the present invention is the above-described peeling method in which the element layer includes a liquid crystal element or an organic EL element.

Another embodiment of the present invention is a method for manufacturing a flexible device, including the steps of peeling a support substrate from a process member by the above-described peeling method, and bonding a flexible substrate to a resin layer with a second resin layer positioned therebetween.

According to one embodiment of the present invention, a novel peeling method can be provided. According to one embodiment of the present invention, a peeling method which achieves high mass productivity with low cost can be provided. According to one embodiment of the present invention, peeling can be performed with the use of a large substrate.

According to one embodiment of the present invention, a novel method for manufacturing a flexible device can be provided. According to one embodiment of the present invention, a highly reliable flexible device can be provided. According to one embodiment of the present invention, a flexible device can be manufactured at low temperatures. According to one embodiment of the present invention, a method for manufacturing a flexible device with a simplified manufacturing process can be provided. According to one embodiment of the present invention, a method for manufacturing a flexible device with high productivity at low cost can be provided. According to one embodiment of the present invention, a flexible device can be manufactured with the use of a large substrate Note that the description of these effects does not preclude the existence of other effects. One embodiment of the present invention does not necessarily achieve all the effects listed above. Other effects can be derived from the description of the specification, the drawings, and the claims.

BRIEF DESCRIPTION OF THE DRAWINGS

FIGS. 1A1, 1A2, 1B1, 1B2, 1C1, 1C2, 1D1, and 1D2 illustrate a peeling method of one embodiment of the present invention.

FIGS. 2A1, 2A2, 2B1, and 2B2 illustrate a peeling method of one embodiment of the present invention.

FIGS. 3A1, 3A2, 3B1, 3B2, 3C1, 3C2, 3D1, and 3D2 illustrate a peeling method of one embodiment of the present invention.

FIGS. 4A1, 4A2, 4B1, 4B2, 4C1, 4C2, 4D1, and 4D2 illustrate a peeling method of one embodiment of the present invention.

FIGS. 5A1, 5A2, 5B1, 5B2, 5C1, 5C2, 5D1, and 5D2 illustrate a peeling method of one embodiment of the present invention.

FIGS. 6A1, 6A2, 6B1, 6B2, 6C1, and 6C2 illustrate a peeling method of one embodiment of the present invention.

FIGS. 7A1, 7A2, 7B1, and 7B2 illustrate a peeling method of one embodiment of the present invention.

FIGS. 10A to 10D illustrate an example of a method for manufacturing a flexible device.

FIGS. 13A to 13E illustrate a process for manufacturing a stack.

FIGS. 14A to 14E illustrate a process for manufacturing a stack.

FIG. 15 illustrates a stack manufacturing apparatus.

FIGS. 17A to 17E illustrate a stack manufacturing process.

FIGS. 18A to 18D illustrate a process for manufacturing a stack.

FIGS. 19A to 19E illustrate a process for manufacturing a stack.

FIGS. 20A to 20D illustrate a process for manufacturing a stack.

DETAILED DESCRIPTION OF THE INVENTION

Figure 8A:
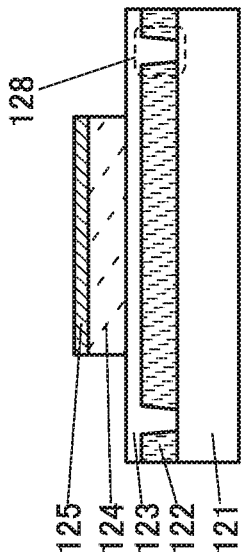
FIGS. 8A and 8B illustrate an example of a method for manufacturing a flexible device.

Embodiments will be described in detail with reference to the drawings. Note that the present invention is not limited to the following description, and it is easily understood by those skilled in the art that various changes and modifications can be made without departing from the spirit and scope of the present invention. Therefore, the present invention should not be interpreted as being limited to the description of embodiments below.

Note that in structures of the present invention described below, the same portions or portions having similar functions are denoted by the same reference numerals in different drawings, and a description thereof is not repeated. Furthermore, the same hatching pattern is applied to portions having similar functions, and the portions are not especially denoted by reference numerals in some cases.

Note that the position, size, range, or the like of each component illustrated in drawings is not accurately represented in some cases for easy understanding. Therefore, the disclosed invention is not necessarily limited to the position, size, range, or the like disclosed in the drawings.

Note that the terms "film" and "layer" can be interchanged with each other depending on the case or circumstances. For example, the term "conductive layer" can be changed into the term "conductive film", and the term "insulating film" can be changed into the term "insulating layer."

Note that in this specification and the like, a "substrate" preferably has a function of supporting at least one of a functional circuit, a functional element, a functional film, and the like. A "substrate" does not necessary have a function of supporting a functional circuit, a functional element, a functional film, and the like, and may have a function of protecting a surface of the device, or a function of sealing at least one of a functional circuit, a functional element, a functional film, and the like, for example.

Embodiment 1

In this embodiment, a peeling method of one embodiment of the present invention is described with reference to FIGS. 1A1, 1A2, 1B1, 1B2, 1C1, 1C2, 1D1, and 1D2, and FIGS. 2A1, 2A2, 2B1, and 2B2.

FIGS. 1A1 and 1A2 are a cross-sectional view and a top view of a process member 10. The cross-sectional view of FIG. 1A1 corresponds to a cross section taken along dashed-dotted line A1-A2 in FIG. 1A2. FIGS. 1B1, 1B2, 1C1, 1C2, 1D1, and 1D2 are cross-sectional views and top views illustrating a method for peeling a support substrate included in the process member 10.

[Structure of Process Member]

The process member 10 includes a support substrate 11, a resin layer 12, an element layer 13, an adhesive layer 30, and a counter substrate 25 (see FIGS. 1A1 and 1A2). The resin layer 12 is provided over the support substrate 11, and the element layer 13 is provided over the resin layer 12. The counter substrate 25 is bonded to the support substrate 11 with the adhesive layer 30 positioned therebetween so that the element layer 13 is sandwiched between the counter substrate 25 and the support substrate 11.

Note that an insulating layer may be provided between the resin layer 12 and the element layer 13. Alternatively, a structure in which an insulating layer is provided between the resin layer 12 and the element layer 13 and the adhesive layer 30 is not provided may be employed (see FIGS. 2A1 and 2A2). FIGS. 2A1 and 2A2 illustrate a structure example in which an insulating layer 15 is provided over the resin layer 12, the element layer 13 is provided over the insulating layer 15, and the counter substrate 25 is in contact with the element layer 13. In that case, the element layer 13 includes a layer for bonding the insulating layer 15 and the counter substrate 25, e.g., a sealant. FIG. 2A1 is a cross-sectional view taken along dashed-dotted line B1-B2 in FIG. 2A2. The counter substrate 25 may be flexible.

The resin layer 12 includes a plurality of openings 20. The openings 20 are provided on the periphery portion of the process member 10 in the top view. Specifically, the openings 20 are provided on two opposite sides of the periphery of the resin layer 12. One opening 20 may be provided on one side of the periphery to extend in the side direction; alternatively, a plurality of openings 20 may be arranged in a dashed-line manner on one side of the periphery. Although the size of each opening 20 may be determined freely, each opening 20 is preferably as small as possible as long as desired adhesion is obtained between the support substrate 11 and the adhesive layer 30 in the opening 20.

Note that the example in which the openings 20 are arranged on two opposite long sides of the periphery of the resin layer 12 is shown in this embodiment, one embodiment of the present invention is not limited thereto. The openings 20 may be arranged on two opposite short sides of the periphery of the resin layer 12 (see FIGS. 2B1 and 2B2). FIG. 2B1 is a cross-sectional view taken along dashed-dotted line A3-A4 in FIG. 2B2.

The support substrate 11 and the adhesive layer 30 are in contact with each other in the openings 20. Note that when an insulating layer is provided over the resin layer 12, the support substrate 11 and the insulating layer are in contact with each other in the openings 20.

The openings 20 are preferably provided on the inner side than the end portion of the resin layer 12 in the top view. In other words, the support substrate 11 and the resin layer 12 are in contact with each other at the end portion of the process member 10.

A photosensitive material is used as the resin layer 12. Specifically, a polyimide is used as the resin layer 12, for example. The thickness of the resin layer 12 is greater than or equal to 0.1 μm and less than or equal to 3 μm, for example.

The element layer 13 includes a display element such as a liquid crystal element or an organic EL element. In addition, the element layer 13 includes a transistor, a capacitor, a wiring, and the like for driving the display element. The element layer 13 is provided on the inner side than the openings 20 in the top view. The process member 10 includes a plurality of element layers 13. Here, one element layer 13 includes the components which form a display device as one end product such as a liquid crystal display or an organic EL display.

Note that the support substrate 11 is not illustrated in the top views in this embodiment although the process member 10 is seen from the support substrate 11 side.

[Method for Peeling Support Substrate]

A method for peeling the support substrate 11 from the process member 10 is described below.

<First Step>

First, the process member 10 illustrated in FIGS. 1A1 and 1A2 is prepared.

<Second Step>

Next, the process member 10 is placed so that the support substrate 11 faces upward, and the process member 10 is irradiated with light 40 from the support substrate 11 side (see FIGS. 1B1 and 1B2). A light source is moved relative to the process member 10 to irradiate the entire surface of the process member 10 with the light 40. Note that FIG. 1B1 illustrates the process member 10 during irradiation with the light 40, and FIG. 1B2 illustrates the process member 10 after the irradiation with the light 40.

The light 40 is light from a laser light source. For example, an excimer laser with a wavelength of 308 nm or a solid-state UV laser with a wavelength of 343 nm or 355 nm can be used as the light 40. A linear laser is preferably used in the irradiation with the light 40. A solid-state laser is preferable because it does not use a gas and thus the running cost can be reduced to approximately ⅓ of the case of an excimer laser.

At this time, the adhesion is reduced or peeling occurs at the interface between the support substrate 11 and the resin layer 12. Alternatively, the resin layer 12 is embrittled or peeling occurs in the resin layer 12. Meanwhile, a region where adhesion is reduced is not formed in the openings 20 by the irradiation with the light 40 because no resin layer 12 is provided in the openings 20. Thus, even during and after the irradiation with the light 40, the position of the support substrate 11 with respect to the resin layer 12 does not change, and the support substrate 11 maintains a function of supporting the resin layer 12 and layers below the resin layer 12 of the process member 10. In FIG. 1B2, a region where the adhesion is reduced or peeling occurs in the interface is referred to as a resin layer 12a, which is shown by a different hatching from the resin layer 12.

The resin layer 12 absorbs part of the light 40; therefore, in the region where the resin layer 12 is provided, the amount of components of the irradiation light 40 which passes through the resin layer 12 toward the under layer is small. Meanwhile, in a region where no resin layer 12 is provided, the irradiation light 40 passes through the resin layer 12 toward the under layer; therefore, the light 40 might damage the structure in layers below the resin layer 12. Since the openings 20 are provided on the outside of the element layer 13 in this embodiment, the element layer 13 can be prevented from being damaged by the irradiation with the light 40.

<Third Step>

Next, a blade 41 is inserted into the end portion of the process member 10 from the interface where the adhesion is reduced or peeling occurs (see FIGS. 1C1 and 1C2). The blade 41 passes through the openings arranged on one side of the periphery of the process member 10. In other words, the support substrate 11 and the adhesive layer 30, which adhere to each other in the openings 20, are cut off from each other by the blade 41.

Since the openings 20 are not provided at the end portion of the resin layer 12, an interface where adhesion is reduced or peeling occurs is formed at the end portion of the process member 10 in the second step. Therefore, the blade 41 can be easily inserted into the end portion of the process member 10.

At this time, it is preferable that the counter substrate 25 be fixed to a stage (not illustrated), and that the support substrate 11 be held by a suction pad or the like (not illustrated).

Next, the blade 41 passes through one side of the periphery which is opposite to the side where the blade 41 has been inserted, in a manner similar to that described above (see FIGS. 1D1 and 1D2). At this time, it is preferable that the counter substrate 25 be fixed to the stage, and that the support substrate 11 be held by a suction pad or the like.

Note that in FIGS. 1C2 and 1D2, a region of the adhesive layer 30 in the opening 20 which is cut off from the support substrate 11 is referred to as an adhesive layer 30a, which is shown by the same hatching as the resin layer 12a.

Through the above steps, the support substrate 11 can be peeled from the process member 10.

A flexible device can be manufactured by using the peeling method of one embodiment of the present invention. That is, a method for manufacturing a flexible device is also one embodiment of the present invention.

For example, the support substrate 11 is peeled from the process member 10 by the above peeling method, and a flexible substrate is bonded to the exposed resin layer 12 with the adhesive layer positioned therebetween, so that a flexible device can be manufactured.

A process member in which a resin layer similar to the resin layer 12 is provided between the counter substrate 25 and the adhesive layer 30 of the process member 10 may be prepared. The support substrate 11 is peeled from the process member, and a flexible substrate is bonded to the exposed resin layer 12 with an adhesive layer positioned therebetween. Then, the counter substrate 25 is peeled from the process member by a method similar to that described above, and another flexible substrate is bonded to the exposed resin layer with another adhesive layer positioned therebetween. Through these steps, a flexible device can be manufactured.

Modification Example 1

In a modification example of this embodiment, a method for peeling a support substrate from a process member that is different from the above-described method is described with reference to FIGS. 3A1, 3A2, 3B1, 3B2, 3C1, 3C2, 3D1, and 3D2.

Specifically, the method of the modification example is different from the above method in that layers 16 are provided in the openings 20 and that the support substrate is peeled with the use of suction pads 42 instead of the blade 41 in the third step. Thus, different portions are described in detail below. Refer to the above description for portions where the same method can be employed.

<First Step>

A process member 10A illustrated in FIGS. 3A1 and 3A2 is prepared.

The layers 16 are provided over the support substrate 11 and the resin layer 12. Specifically, the layers 16 are provided between the support substrate 11 and the adhesive layer 30 to cover the support substrate 11 at least in the openings 20.

When a material whose adhesion to the support substrate 11 is weaker than the adhesion between the support substrate 11 and the adhesive layer 30 is used for the layers 16, the support substrate 11 can be peeled from the process member without using the blade 41.

<Second Step>

Next, the process member 10A is placed so that the support substrate 11 faces upward, and the process member 10A is irradiated with the light 40 from the support substrate 11 side (see FIGS. 3B1 and 3B2).

<Third Step>

Next, the counter substrate 25 is fixed to a stage (not illustrated), and a plurality of suction pads 42 are positioned on the periphery of the support substrate 11 at intervals that are set as equal as possible and hold the support substrate 11. Then, the suction pads 42 are lifted up; as a result, the support substrate 11 is peeled from the process member 10A (see FIGS. 3C1, 3C2, 3D1, and 3D2).

FIGS. 3C1 and 3C2 illustrate a state where the support substrate 11 and the layer 16 that adhere to each other in the opening 20 provided on one side of the periphery of the process member 10A are being separated from each other. FIGS. 3D1 and 3D2 illustrate a state where the support substrate 11 and the layer 16 that adhere to each other in the opening 20 provided on one side of the periphery which is opposite to the aforementioned side are being separated from each other. FIG. 3C1 is a cross-sectional view taken along dashed-dotted line C3-C4 which is different from the dashed-dotted line C1-C2 in FIGS. 3A2 and 3B2.

The number of the suction pads 42 used for peeling is preferably four or more, further preferably eight or more, though it depends on the top surface area of the process member 10A. The suction pads 42 are arranged on the periphery of the support substrate 11 at intervals that are set as equal as possible, and the suction pads 42 hold the support substrate 11. Then, the displacement of the individual suction pads 42 is controlled as peeling along the interface between the support substrate 11 and the layer 16 progresses, which can stabilize the progress rate of the peeling and prevent breakage of the support substrate 11. In the example shown in FIGS. 3C1, 3C2, 3D1, and 3D2, eight suction pads 42 are used.

It is preferable that a material of the layers 16 be selected so that after irradiation with the light 40, the layers 16 are not peeled by minor physical stimuli, e.g., vibrations during transportation, but are easily peeled by pulling with the suction pads 42. Specific examples include indium tin oxide (ITO) and In—Ga—Zn oxide. To shorten the manufacturing process, it is preferable to use a material similar to that of a wiring or the like included in the element layer 13 for the layers 16 because the layers 16 and the wiring or the like can be formed at the same time.

The degree of adhesion between the support substrate 11 and the layer 16 may be adjusted by increase or reduction in the top surface area of the opening 20 where the layer 16 is provided.

The layers 16 are not necessarily provided when, for example, the adhesion between the support substrate 11 and the adhesive layer 30 is reduced by reduction in size of the openings 20 in the process member 10A, and the support substrate 11 and the adhesive layer 30 can be peeled with the suction pads 42 described in this modification example.

Through the above steps, the support substrate 11 can be peeled from the process member 10A.

Modification Example 2

A method for peeling a support substrate from a process member that is different from the above-described method is described with reference to FIGS. 4A1, 4A2, 4B1, 4B2, 4C1, 4C2, 4D1, and 4D2.

Specifically, the method of this modification example is different from the above-described method in that the layer 16 is provided in some of the openings 20 in the process member, and that the support substrate is peeled by using the blade 41 and the suction pads 42 in the third step and the fourth step, respectively. Different portions are described in detail below. Refer to the above description for portions where the same method can be employed.

<First Step>

A process member 10B illustrated in FIGS. 4A1 and 4A2 is prepared.

The layer 16 is provided over the support substrate 11 and the resin layer 12. Specifically, the layer 16 is provided between the support substrate 11 and the adhesive layer 30 in at least one of the openings 20. For example, the layer 16 is not provided in a region which is cut with the blade 41 and located between the support substrate 11 and the adhesive layer 30, whereas the layer 16 is provided in a region which is located between the support substrate 11 and the adhesive layer 30 and in which peeling is caused by the suction pads 42.

<Second Step>

Next, the process member 10B is placed so that the support substrate 11 faces upward, and the process member 10B is irradiated with the light 40 from the support substrate 11 side (see FIGS. 4B1 and 4B2).

<Third Step>

Next, the blade 41 is inserted into the end portion of the process member 10B from the interface where the adhesion is reduced or peeling is caused by the irradiation with the light 40 (see FIGS. 4C1 and 4C2). The blade 41 passes through the openings arranged on one side of the periphery of the process member 10B. At this time, the blade 41 passes through the openings 20 where no layer 16 is provided. The support substrate 11 and the adhesive layer 30 that adhere with each other in the openings 20 arranged on the one side of the periphery are cut off from each other by the blade 41.

<Fourth Step>

Next, the counter substrate 25 is fixed to a stage (not illustrated), and a plurality of suction pads 42 are positioned on the periphery of the support substrate 11 at intervals that are set as equal as possible and hold the support substrate 11. Then, the suction pads 42 are lifted up; as a result, the support substrate 11 is peeled from the process member 10B (see FIGS. 4D1 and 4D2). FIGS. 4D1 and 4D2 illustrate a state where the support substrate 11 and the layer 16 that adhere to each other in the opening 20 provided along a side opposite to the side into which the blade 41 is inserted are being separated from each other.

Through the above steps, the support substrate 11 can be peeled from the process member 10B.

This embodiment can be combined with any of other embodiments as appropriate.

Embodiment 2

In this embodiment, a peeling method of one embodiment of the present invention which is different from that described in Embodiment 1 is described with reference to FIGS. 5A1, 5A2, 5B1, 5B2, 5C1, 5C2, 5D1, and 5D2 and FIGS. 6A1, 6A2, 6B1, 6B2, 6C1, and 6C2.

FIGS. 5A1 and 5A2 are a cross-sectional view and a top view of a process member 10C. The cross-sectional view of FIG. 5A1 corresponds to a cross section taken along dashed-dotted line E1-E2 in FIG. 5A2. FIGS. 5B1, 5B2, 5C1, 5C2, 5D1, and 5D2 are cross-sectional views and top views illustrating a method for peeling a support substrate included in the process member 10C.

[Structure of Process Member]

The process member 10C includes the support substrate 11, a resin layer 12b, the element layer 13, the adhesive layer 30, and the counter substrate 25 (see FIGS. 5A1 and 5A2). The resin layer 12b is provided over the support substrate 11, and the element layer 13 is provided over the resin layer 12b. The counter substrate 25 is bonded to the support substrate 11 with the adhesive layer 30 positioned therebetween so that the element layer 13 is sandwiched between the counter substrate 25 and the support substrate 11.

A photosensitive material is used as the resin layer 12b. Specifically, a polyimide is used as the resin layer 12b, for example. The thickness of the resin layer 12b is greater than or equal to 0.1 μm and less than or equal to 3 μm, for example.

The element layer 13 includes a display element such as a liquid crystal element or an organic EL element. In addition, the element layer 13 includes a transistor, a capacitor, a wiring, and the like for driving the display element. The process member 10 includes a plurality of element layers 13. Here, one element layer 13 includes the components which form a display device as one end product such as a liquid crystal display or an organic EL display.

Note that the support substrate 11 is not illustrated in the top views in this embodiment because the process member 10C is seen from the support substrate 11 side.

[Method for Peeling Support Substrate]

A method for peeling the support substrate 11 from the process member 10C is described below.

<First Step>

First, the process member 10C illustrated in FIGS. 5A1 and 5A2 is prepared.

<Second Step>

Next, the process member 10C is placed so that the support substrate 11 faces upward, and the process member 10C is irradiated with the light 40 from the support substrate 11 side (see FIGS. 5B1 and 5B2). A light source is move relative to the process member 10C to irradiate the process member 10C with the light 40. Note that FIG. 5B1 illustrates the process member 10C during irradiation with the light 40, and FIG. 5B2 illustrates the process member 10C after the irradiation with the light 40.

The light 40 is light from a laser light source. For example, an excimer laser with a wavelength of 308 nm or a solid-state UV laser with a wavelength of 343 nm or 355 nm can be used as the light 40. A linear laser is preferably used in the irradiation with the light 40. A solid-state laser is preferable because it does not use a gas and thus the running cost can be reduced to approximately ⅓ of the case of an excimer laser.

Irradiation with the light 40 is performed on the entire surface of the process member 10C except two opposite sides of the periphery in the top view. At this time, in the irradiated region, adhesion is reduced or peeling occurs at the interface between the support substrate 11 and the resin layer 12b. Alternatively, in the irradiated region, the resin layer 12b is embrittled or peeling occurs in the resin layer 12b. In contrast, a region where adhesion is reduced is not formed in a region which is not irradiated with the light 40. Thus, even during and after the irradiation with the light 40, the position of the support substrate 11 with respect to the resin layer 12b does not change, and the support substrate 11 maintains a function of supporting the resin layer 12b and layers below the resin layer 12b of the process member 10C.

In FIG. 5B2, a region where the adhesion is reduced or peeling occurs at the interface is referred to as a resin layer 12c, which is shown by a different hatching from the resin layer 12b. In addition, regions which are not irradiated with the light 40 in FIGS. 5B1 and 5B2 are referred to as regions 45.

Although the size of each region 45 may be determined freely, each region 45 is preferably as small as possible as long as desired adhesion is obtained between the support substrate 11 and the resin layer 12b in the region 45.

Note that the example in which the regions 45 extend along the two opposite long sides of the periphery of the process member 10C is described in this embodiment, one embodiment is not limited thereto. The regions 45 may extend along two opposite short sides of the periphery of the process member 10C (see FIGS. 6A1 and 6A2). FIG. 6A1 is a cross-sectional view taken along dashed-dotted line E3-E4 illustrated in FIG. 6A2.

In the second step, instead of the irradiation on the region except the regions 45 in the above manner, light-blocking masks 43a may be provided over the support substrate 11 and then the entire surface of the process member 10C may be irradiated with the light 40 (see FIGS. 6B1 and 6B2). When the light-blocking masks 43 are provided along two opposite long sides of the periphery of the process member 10C, regions over which the light-blocking masks 43 are provided can be blocked from the light 40 to be regions 45a which are not irradiated with the light 40.

FIGS. 6B1 and 6B2 illustrate the example in which the light-blocking masks 43 are provided in the regions overlapping with the regions 45 illustrated in FIGS. 5B1 and 5B2; however, one embodiment of the present invention is not limited thereto. For example, as illustrated in FIGS. 6C1 and 6C2, light-blocking masks 43a may be provided along two opposite long sides of the periphery of the process member 10C except end portions. The end portions of the process member 10C are irradiated with the light 40, whereby the blade 41 can be easily inserted thereinto in the next step. In FIGS. 6C1 and 6C2, regions which are not irradiated with the light 40 are referred to as regions 45b, over which the light-blocking masks 43a are provided.

<Third Step>

Next, the blade 41 is inserted into the end portion of the process member 10C from the interface between the support substrate 11 and the resin layer 12b or a side surface of the resin layer 12b (see FIGS. 5C1 and 5C2). The blade 41 passes through the region 45 positioned on one side of the periphery of the process member 10C. In other words, the support substrate 11 and the resin layer 12b, which adhere to each other in the region 45, are cut off from each other by the blade 41.

Next, the blade 41 passes through one side of the periphery which is opposite to the side where the blade 41 has been inserted, in a manner similar to that described above (see FIGS. 5D1 and 5D2). In the third step, it is preferable that the counter substrate 25 be fixed to the stage, and that the support substrate 11 be held by a suction pad or the like.

Through the above steps, the support substrate 11 can be peeled from the process member 10C.

A flexible device can be manufactured by using the peeling method of one embodiment of the present invention. That is, a method for manufacturing a flexible device is also one embodiment of the present invention.

For example, the support substrate 11 is peeled from the process member 10C by the above peeling method, and a flexible substrate is bonded to the exposed resin layer 12b with the adhesive layer positioned therebetween, so that a flexible device can be manufactured.

A process member in which a resin layer similar to the resin layer 12b is provided between the counter substrate 25 and the adhesive layer 30 of the process member 10C may be prepared. The support substrate 11 is peeled from the process member, and a flexible substrate is bonded to the exposed resin layer 12b with an adhesive layer positioned therebetween. Then, the counter substrate 25 is peeled from the process member by a method similar to that described above, and another flexible substrate is bonded to the exposed resin layer with another adhesive layer positioned therebetween. Through these steps, a flexible device can be manufactured.

Modification Example 3

In a modification example of this embodiment, a method for peeling the support substrate 11 from the process member 10C that is different from the above-described method is described with reference to FIGS. 7A1, 7A2, 7B1, and 7B2.

Specifically, the method of the modification example is different from the above method in that the support substrate is peeled with the use of the suction pads 42 instead of the blade 41 in the third step. Thus, different portions are described in detail below. Refer to the above description for portions where the same method can be employed.

<First Step>

The process member 10C illustrated in FIGS. 5A1 and 5A2 is prepared.

<Second Step>

Next, the process member 10C is placed so that the support substrate 11 faces upward, and the process member 10C is irradiated with the light 40 from the support substrate 11 side (see FIGS. 5B1 and 5B2).

<Third Step>

Next, the counter substrate 25 is fixed to a stage (not illustrated), and a plurality of suction pads 42 are positioned on the periphery of the support substrate 11 at intervals that are set as equal as possible and hold the support substrate 11. Then, the suction pads 42 are lifted up; as a result, the support substrate 11 is peeled from the process member 10C (see FIGS. 7A1, 7A2, 7B1, and 7B2).

When the adhesion between the support substrate 11 and the resin layer 12b in the regions 45 is small to some extent, the support substrate 11 can be physically peeled from the process member 10C without using the blade 41. Note that when the areas of the regions 45 are reduced, the support substrate 11 can be peeled from the process member 10C more easily in this step.

FIGS. 7A1 and 7A2 illustrate a state where the support substrate 11 and the resin layer 12b that adhere to each other in the region 45 provided on one side of the periphery of the process member 10C are being separated from each other. FIGS. 7B1 and 7B2 illustrate a state where the support substrate 11 and the resin layer 12b that adhere to each other in the region 45 provided on one side of the periphery which is opposite to the aforementioned side are being separated from each other. FIG. 7A1 is a cross-sectional view taken along dashed dotted line E5-E6 which is different from the dashed-dotted line E1-E2 in FIGS. 5A2 and 5B2.

The number of the suction pads 42 used for peeling is preferably four or more, further preferably eight or more, though it depends on the top surface area of the process member 10C. The suction pads 42 are arranged on the periphery of the support substrate 11 at intervals that are set as equal as possible, and the suction pads 42 hold the support substrate 11. Then, the displacement of the individual suction pads 42 is controlled as peeling along the interface between the support substrate 11 and the resin layer 12b progresses, which can stabilize the progress rate of the peeling and prevent breakage of the support substrate 11. In the example shown in FIGS. 7A1, 7A2, 7B1, and 7B2, eight suction pads 42 are used.

Through the above steps, the support substrate 11 can be peeled from the process member 10C.

This embodiment can be combined with any of other embodiments as appropriate.

Embodiment 3

In this embodiment, a method for manufacturing a flexible device of one embodiment of the present invention is described with reference to FIGS. 8A and 8B, FIGS. 9A to 9D, FIGS. 10A to 10D, and FIGS. 11A to 11D.

A resin layer with a thickness of greater than or equal to 0.1 µm and less than or equal to 3 µm is formed over a support substrate by using a photosensitive material, and then a transistor including an oxide semiconductor in a channel formation region is formed over the resin layer, whereby a process member is obtained. The resin layer is irradiated with laser light with a linear laser to separate the resin layer and the support substrate from each other; as a result, a flexible device can be manufactured.

An oxide semiconductor is used for the channel formation region of the transistor. With the use of an oxide semiconductor, the maximum process temperature can be lower than that of the case of using low-temperature polysilicon (LTPS).

In the case where LTPS is used for the channel formation region of the transistor, the resin layer is required to have heat resistance because heat at a temperature of approximately 500° C. to 550° C. needs to be applied. Furthermore, the resin layer needs to have a large thickness so that damage in a step of laser crystallization is reduced. In addition, the band gap of silicon is as narrow as 1.1 eV; therefore, also to prevent silicon from absorbing laser light when the resin layer is irradiated with laser light so that the transistor is peeled from the support substrate, the resin layer needs to have a large thickness.

In contrast, unlike the case of LTPS, the transistor formed using an oxide semiconductor does not need heat treatment at high temperatures and can be formed at a temperature lower than or equal to 350° C., or even lower than or equal to 300° C. Thus, the resin layer is not required to have high heat resistance. Accordingly, the heat resistant temperature of the resin layer can be made low, and the range of choices for the materials can be widened. The transistor including an oxide semiconductor does not require laser crystallization process. The band gap of an oxide semiconductor is wide, greater than or equal to 2.5 eV and less than or equal to 3.5 eV (preferably greater than or equal to 3 eV and less than or equal to 3.5 eV), and an oxide semiconductor is less likely to absorb laser light than silicon; therefore, the thickness of the resin layer can be small even when a laser is used in the peeling process. Since the resin layer is not required to have high heat resistance and can be thinned, the manufacturing cost of a device can be significantly reduced. A metal oxide is preferably used, in which case the steps can be simplified as compared with the case where LTPS is used.

The method for manufacturing a flexible device of one embodiment of the present invention includes the peeling method described in Embodiment 1. The peeling method corresponds to a method for separating the transistor and the support substrate from each other in manufacturing a flexible device of one embodiment of the present invention.

Laser light irradiation of the resin layer causes peeling at the interface between the support substrate and the resin layer or makes the resin layer brittle. When peeling progresses during laser light irradiation, positional deviation between the support substrate and the resin layer occurs, which might result in unexpected trouble. When the location where laser irradiation is performed is different from the location where peeling is performed, it is necessary that the positional relationship between the support substrate and the resin layer do not change even after laser irradiation and that handleability for transferring the process member not be lost.

In the peeling method of one embodiment of the present invention, the resin layer includes openings which are positioned in a periphery portion of the process member. Since peeling between the support substrate and the process member does not occur in the openings even with laser light irradiation, the position of the support substrate with respect to the resin layer can be prevented from changing after laser light irradiation of the process member. In addition, the support substrate can, for example, be held or adsorbed when being transferred even after laser irradiation; thus, handleability of the process member is excellent in the process for manufacturing a flexible device.

An example of a method for manufacturing a flexible device including a liquid crystal element as a display element is described below.

Figure 8B:
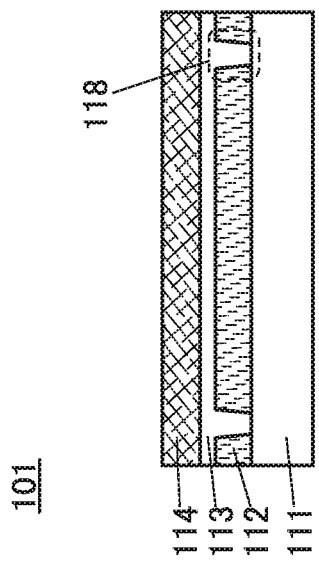

First, a first stack 101 illustrated in FIG. 8A and a second stack 102 illustrated in FIG. 8B are prepared.

The first stack 101 includes a support substrate 111, a resin layer 112, an insulating layer 113, and an FET layer 114. The resin layer 112, the insulating layer 113, and the FET layer 114 are provided over the support substrate 111 in this order. Openings 118 are provided on the periphery of the resin layer 112. The support substrate 111 and the insulating layer 113 are in contact with each other in the openings 118.

A glass substrate is used as the support substrate 111.

The resin layer 112 is formed to a thickness of greater than or equal to 0.1 μm and less than or equal to 3 μm with the use of a photosensitive material. For example, a polyimide is used as the resin layer 112.

A single layer or a stack of layers formed using a material which prevents impurities such as water from passing therethrough is used as the insulating layer 113.

The FET layer 114 includes a transistor in which an oxide semiconductor is used for a channel formation region. In addition, the FET layer 114 includes circuit elements, e.g., a capacitor and a transistor for driving a liquid crystal element, wirings, and the like.

The second stack 102 includes a support substrate 121, a resin layer 122, an insulating layer 123, a functional layer 124, and a conductive layer 125. The resin layer 122, the insulating layer 123, the functional layer 124, and the conductive layer 125 are provided over the support substrate 121 in this order. Openings 128 are provided on the periphery of the resin layer 122. The support substrate 121 and the insulating layer 123 are in contact with each other in the openings 128.

The support substrate 121, the resin layer 122, and the insulating layer 123 can be formed using materials similar to those of the support substrate 111, the resin layer 112, and the insulating layer 113, respectively.

The functional layer 124 includes at least one of a coloring layer, a light-blocking layer, and an overcoat layer. In addition, the functional layer 124 may include a sensing element such as a touch sensor.

A conductive material which transmits visible light is used for the conductive layer 125.

Next, the first stack 101 and the second stack 102 are bonded to each other with a sealant 133. A space enclosed by the first stack 101, the second stack 102, and the sealant 133 is filled with a liquid crystal material. Through the steps, a process member 105 is formed (see FIG. 9A). Together with a pixel electrode of the FET layer 114 and the conductive layer 125, a liquid crystal layer 131 forms a liquid crystal element. The conductive layer 125 functions as a common electrode of the liquid crystal element. A spacer 132 is provided between the FET layer 114 and the conductive layer 125 in order to keep the thickness of the liquid crystal layer 131.

The liquid crystal layer 131 is surrounded by the sealant 133 in a top view (not illustrated). A sealant 134 surrounds the sealant 133 with a space provided therebetween. Part of the outermost surface of the FET layer 114 and part of the outermost surface of the insulating layer 123 which are in contact with the sealant 133 are preferably formed of an organic material which prevents water from passing therethrough. The sealant 134 serves a dummy seal and is to be removed in the middle of the manufacture of the flexible device; therefore, part of the uppermost surface of the FET layer 114 and part of the uppermost surface of the insulating layer 123 that are in contact with the sealant 134 are not limited to an organic material. Accordingly, to adjust the thickness of the sealant 134, a resin layer may be provided over part of the FET layer or part of the insulating layer 123 which overlaps with the sealant 134.

Figure 9A:
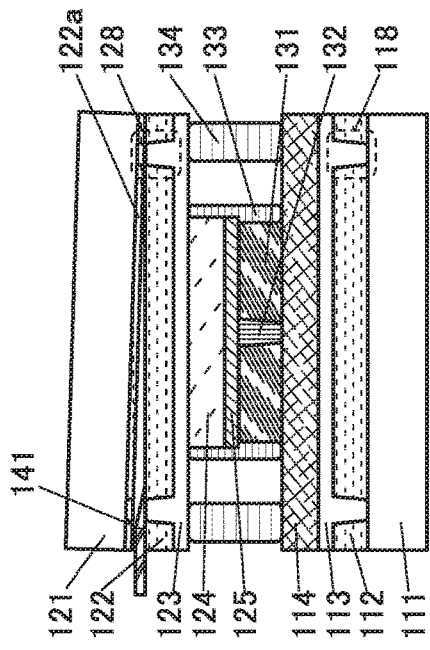
FIGS. 9A to 9D illustrate an example of a method for manufacturing a flexible device.
Figure 9C:
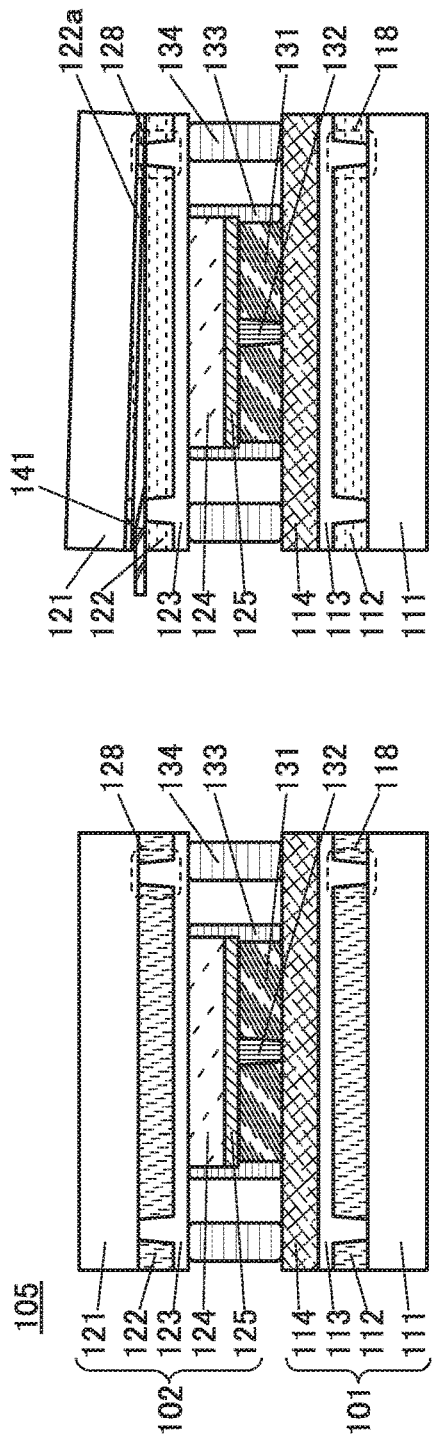
Figure 9D:
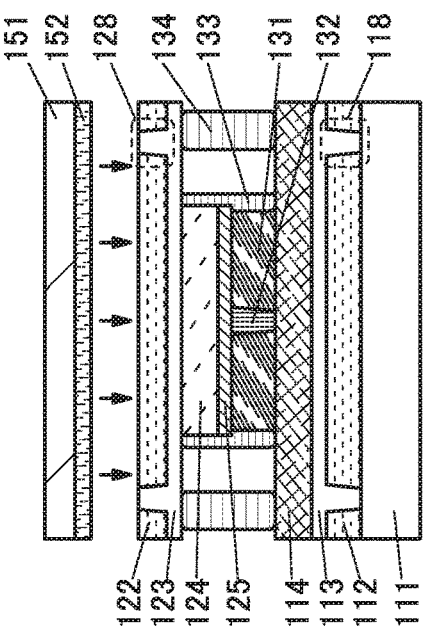
Figure 9B:
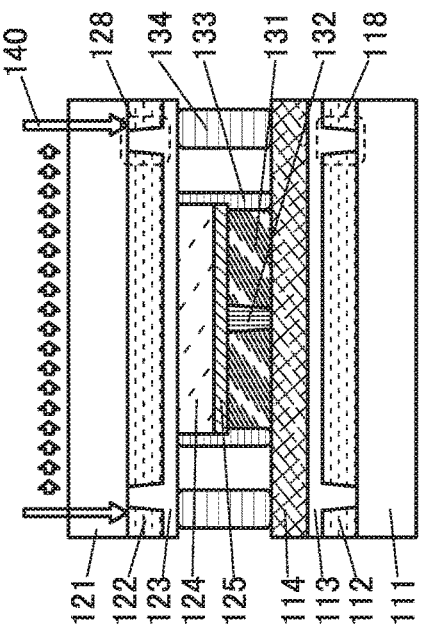

Next, the resin layer 122 is irradiated with light 140 through the support substrate 121, as illustrated in FIG. 9B. A linear laser is preferably used in the irradiation with the light 140. A light source is moved relative to the support substrate 121 to perform the laser light irradiation. Although the support substrate 121 is peeled prior to the support substrate 111 here, one embodiment of the present invention is not limited thereto. In the case where the support substrate 111 is peeled prior to the support substrate 121, the resin layer 112 is irradiated with laser light through the support substrate 111 with the use of a linear laser.

Next, the support substrate 121 is peeled from the resin layer 122 with the use of a blade 141 or the like, as illustrated in FIG. 9C. Refer to Embodiment 1 for details of the peeling method. FIG. 9C illustrates an example where peeling occurs in the resin layer 122. Part of the resin layer 122 (a resin layer 122a) remains on the support substrate 121 side. Part of the resin layer 122 remaining on the insulating layer 123 side is thinner than the resin layer 122 illustrate in FIG. 9B. Note that peeling may occur at the interface between the support substrate 121 and the resin layer 122 depending on the manufacturing conditions (e.g., the material of the resin layer 122 and laser irradiation conditions).

Next, the exposed resin layer 122 and a substrate 151 are bonded to each other with an adhesive layer 152, as illustrated in FIG. 9D. The substrate 151 preferably has flexibility.

Next, the resin layer 112 is irradiated with the light 140 through the support substrate 111, as illustrated in FIG. 10A. A linear laser is preferably used in the irradiation with the light 140. A light source is moved relative to the support substrate 111 to perform the laser light irradiation.

Next, the support substrate 111 is peeled from the resin layer 112 with the use of the blade 141 or the like, as illustrated in FIG. 10B. Refer to Embodiment 1 for details of the peeling method. FIG. 10B illustrates an example where peeling occurs in the resin layer 112. Part of the resin layer 112 (a resin layer 112a) remains on the support substrate 111 side. Part of the resin layer 112 remaining on the insulating layer 113 side is thinner than the resin layer 112 illustrate in FIG. 10A. Note that peeling may occur at the interface between the support substrate 111 and the resin layer 112 depending on the manufacturing conditions (e.g., the material of the resin layer 112 and laser irradiation conditions).

Next, the exposed resin layer 112 and a substrate 153 are bonded to each other with an adhesive layer 154, as illustrated in FIG. 10C. The substrate 153 preferably has flexibility. At this time, a process member 105a having flexibility is formed (see FIG. 10D).

Figure 11A:
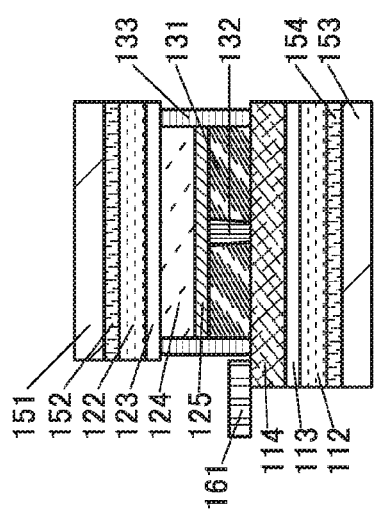
FIGS. 11A to 11D illustrate an example of a method for manufacturing a flexible device.

Next, to expose a terminal electrode (not illustrated) of the FET layer 114, a region which is located above the FET layer 114 and overlaps with the terminal electrode is removed (see FIG. 11A). Specifically, part of the substrate 151, part of the adhesive layer 152, part of the resin layer 122, part of the insulating layer 123, part of the sealant 134, and the like which overlap with the terminal electrode are removed.

Figure 11B:
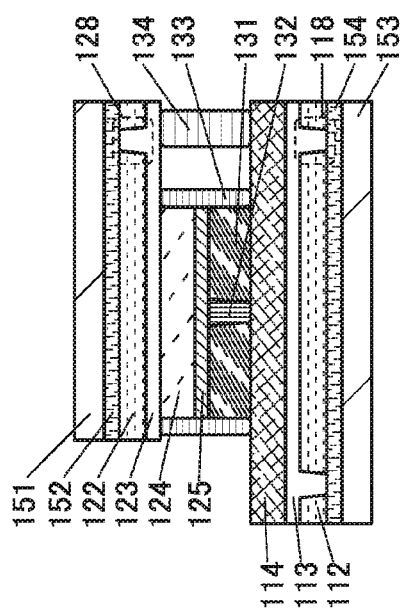

Then, the periphery of the process member 105a is cut to be removed (see FIG. 11B). In this step, part of the resin layer 112 which includes the opening 118, part of the resin layer 122 which includes the opening 128, and the sealant 134 are removed. Note that, when the process member 105a includes a plurality of sets of elements (each set of elements forms one flexible substrate and includes the FET layer 114, the functional layer 124, the conductive layer 125, the liquid crystal layer 131, the spacer 132, the sealant 133, and the like), e.g., when the elements correspond to the element layer 13 illustrated in FIG. 2A1, the process member 105a can be divided in that step into a plurality of process members each of which includes one set of the elements.

Figure 11C:
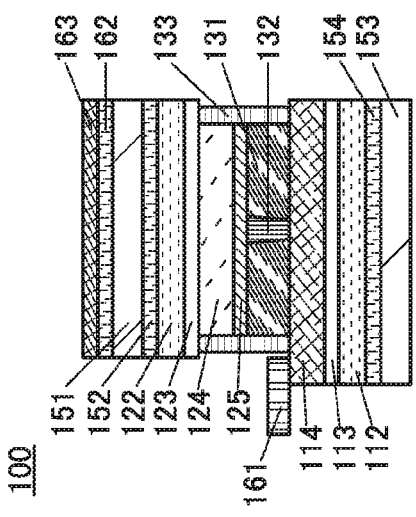

Subsequently, an FPC 161 is connected to the terminal electrode of the FET layer 114 that has been exposed as illustrated in FIG. 11A (see FIG. 11C). Note that instead of the FPC 161, an IC may be connected to the terminal electrode by a chip on glass (COG) method or a chip on film (COF) method.

Figure 11D:
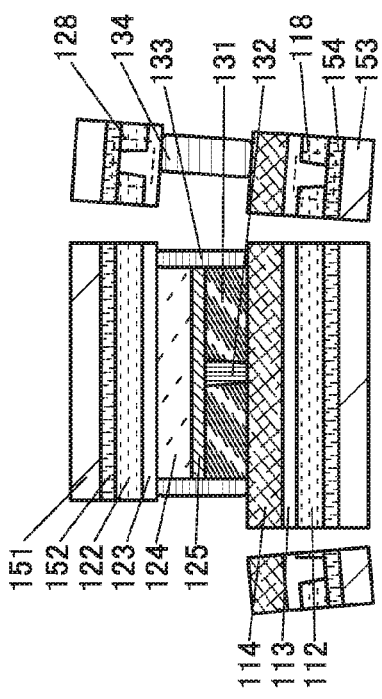

After that, a polarization plate 163 is provided over the substrate 151 with an adhesive layer 162 provided therebetween (see FIG. 11D). The polarization plate 163 preferably has flexibility.

Through the above steps, a flexible device 100 provided with a reflective liquid crystal element can be manufactured.

This embodiment can be combined with any of other embodiments as appropriate.

Embodiment 4

In this embodiment, a stack manufacturing apparatus of one embodiment of the present invention is described with reference to FIG. 12 and FIGS. 13A to 13E.

The stack manufacturing apparatus includes a first supply unit that supplies a process member having a sheet-like shape, a first separation unit that is supplied with the process member and divides the process member into one surface layer and a first remaining portion, a support body supply unit that supplies a first support body having a sheet-like shape, a first bonding unit that is supplied with the first remaining portion and the first support body and bonds the first remaining portion and the first support body to each other with a first adhesive layer, and a first unloading unit that unloads a first stack including the first remaining portion, the first adhesive layer, and the first support body. In the first separation unit, peeling of the support substrate (substrate) is performed as described in Embodiment 1.

The stack manufacturing apparatus having the above structure manufactures a stack using the sheet-like process member supplied to the first supply unit. The first separation unit divides the process member into the one surface layer and the first remaining portion. The first bonding unit bonds the first remaining portion and the sheet-like first support body supplied from the support body supply unit to each other with the first adhesive layer. Then, the first unloading unit unloads the first stack including the first remaining portion, the first adhesive layer, and the first support body.

Figure 12:
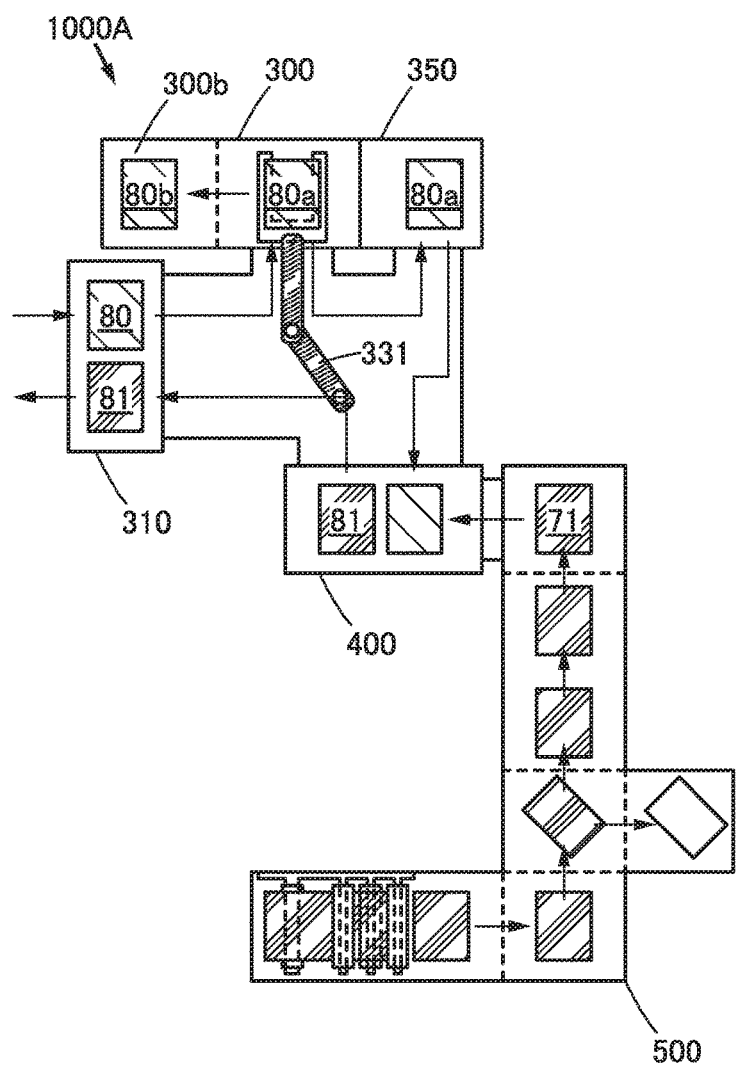
FIG. 12 illustrates a stack manufacturing apparatus.

FIG. 12 is a schematic diagram illustrating a structure of a stack manufacturing apparatus 1000A, and a transfer path of a process member and a stack in a process.

FIGS. 13A to 13E are schematic views illustrating a process for manufacturing a stack with the use of the stack manufacturing apparatus 1000A. FIGS. 13A, 13D, and 13E each illustrate a plan view and a cross-sectional view taken along dashed-dotted line X1-X2 in the plan view. FIGS. 13B and 13C each illustrate only a cross-sectional view.

The stack manufacturing apparatus 1000A described in this embodiment includes a first supply unit 310, a first separation unit 300, a first bonding unit 400, and a support body supply unit 500 (FIG. 12).

Note that each unit can be named freely, and the name does not limit the function of each unit.

The peeling method of one embodiment of the present invention, which is described in Embodiment 1, is employed in the first separation unit 300 in this embodiment.

The first supply unit 310 can supply a process member 80. Note that the first supply unit 310 can also serve as the first unloading unit.

The first separation unit 300 can separate a first remaining portion 80a and a first substrate 211 serving as one surface layer 80b of the process member 80 from each other (FIG. 12 and FIGS. 13A to 13C).

Note that in this specification, the surface layer may have a stacked-layer structure instead of a single-layer structure as long as it includes an outermost layer. For example, although one surface layer is the first substrate 211 in FIG. 13A, the one surface layer may include the first substrate 211 and part of a first resin layer 213 in some cases.

The first bonding unit 400 is supplied with the first remaining portion 80a and a first support body 71. In the first bonding unit 400, the first support body 71 and the first remaining portion 80a are bonded to each other with a first adhesive layer 231 (see FIG. 12 and FIGS. 13D and 13E). The first remaining portion 80a and the first support body 71 are bonded to each other with the first adhesive layer 231 positioned therebetween to obtain a stack 81.

The support body supply unit 500 supplies the first support body 71 (see FIG. 12).

The first supply unit 310 also serving as the first unloading unit can unload the stack 81 (FIG. 12 and FIG. 13E). The stack manufacturing apparatus 1000A may include an unloading unit and a supply unit separately.

The stack manufacturing apparatus 1000A includes the first supply unit 310 that supplies the process member 80 and also serves as the first unloading unit for unloading the stack 81, the first separation unit 300 that separates the one surface layer 80b and the first remaining portion 80a of the process member 80 from each other, the first bonding unit 400 that bonds the first support body 71 to the first remaining portion 80a, and the support body supply unit 500 that supplies the first support body 71. This structure makes it possible to peel the one surface layer 80b of the process member 80 and bond the first support body 71 to the first remaining portion 80a which is separated. As described above, one embodiment of the present invention can provide the stack manufacturing apparatus 1000A for manufacturing a stack including a support body and a remaining portion of a process member.

Furthermore, the stack manufacturing apparatus 1000A described in this embodiment includes a first storage portion 300b, a first cleaning device 350, a transfer mechanism 331, and the like (see FIG. 12).

The first storage portion 300b stores the one surface layer 80b peeled from the process member 80.

The first cleaning device 350 cleans the first remaining portion 80a peeled from the process member 80.

The transfer mechanism 331 transfers the process member 80, the first remaining portion 80a separated from the process member 80, and the stack 81.

Note that the stack manufacturing apparatus 1000A does not necessarily include the first cleaning device 350 (see FIG. 15).

[Stack Manufacturing Apparatus]

Individual components of the stack manufacturing apparatus 1000A are described below.

<First Supply Unit>

The first supply unit 310 supplies the process member 80. For example, to allow the transfer mechanism 331 to transfer a plurality of process members 80 successively, a multistage storage capable of storing the plurality of process members 80 can be included.

Furthermore, the first supply unit 310 described in this embodiment also serves as the first unloading unit. The first supply unit 310 unloads the stack 81 including the first remaining portion 80a, the first adhesive layer 231, and the first support body 71. For example, to allow the transfer mechanism 331 to transfer a plurality of stacks 81 successively, a multistage storage capable of storing the plurality of stacks 81 can be included.

<First Separation Unit>

The first separation unit 300 includes at least one of a laser device for performing irradiation with light 240, a cutting mechanism including a blade 241, and a peeling control mechanism provided with multiple suction pads (e.g., 12 suction pads), for example. The cutting mechanism includes one or more blades 241 with sharp tips and a moving mechanism for moving the blade(s) 241 relative to the process member 80.

Note that the first separation unit 300 does not necessarily include the laser device. In that case, the laser device is provided outside the stack manufacturing apparatus 1000A.

<First Bonding Unit>

The first bonding unit 400 includes a mechanism for forming the first adhesive layer 231 and a crimp mechanism for bonding the first remaining portion 80a and the first support body 71 to each other with the use of the first adhesive layer 231.

Examples of the mechanism for forming the first adhesive layer 231 include a dispenser for applying a liquid adhesive and a device for supplying an adhesive sheet shaped as a sheet in advance.

Note that the first adhesive layer 231 may be formed on the first remaining portion 80a and/or the first support body 71. Specifically, the first support body 71 on which the first adhesive layer 231 is formed in advance may be used.

Examples of the crimp mechanism for bonding the first remaining portion 80a and the first support body 71 to each other include mechanisms for applying pressure that are controlled to apply a constant pressure or provide a uniform gap, such as a pair of rollers, a flat plate and a roller, and a pair of flat plates facing each other.

<Support Body Supply Unit>

The support body supply unit 500 supplies the first support body 71. For example, the support body supply unit 500 unrolls a film supplied in a rolled shape, cuts the film to a predetermined length, activates a surface of the film, and supplies the film as the first support body 71.

[Method for Manufacturing Stack]

A method for manufacturing the stack 81 from the process member 80 with the use of the stack manufacturing apparatus 1000A is described below with reference to FIG. 12 and FIGS. 13A to 13E.

The process member 80 includes the first substrate 211, the first resin layer 213 whose one surface is in contact with the first substrate 211, a bonding layer 230 whose one surface is in contact with the other surface of the first resin layer 213, and a second substrate 225 in contact with the other of the surface of the bonding layer 230 (see FIG. 13A). The first resin layer 213 includes openings 220.

<First Step>

The process member 80 is loaded into the first supply unit 310. The first supply unit 310 supplies the process member 80, and the transfer mechanism 331 transfers the process member 80 and supplies the process member 80 to the first separation unit 300.

<Second Step>

The first separation unit 300 peels the first substrate 211 serving as the one surface layer 80b of the process member 80 with the use of the light 240 and the blade 241 (see FIGS. 13B and 13C). Refer to the peeling method of one embodiment of the present invention described in Embodiment 1 for specific process of the second step. Note that suction pads may be used instead of the blade 241.

By this step, the first remaining portion 80a is obtained from the process member 80. Specifically, the first remaining portion 80a includes the first resin layer 213, the bonding layer 230 whose one surface is in contact with the first resin layer 213, and the second substrate 225 in contact with the other surface of the bonding layer 230.

Note that in the case where the first separation unit 300 does not include a laser device for irradiation with the light 240, the process member 80 is irradiated with the light 240 outside the stack manufacturing apparatus 1000A and then transferred to the first supply unit 310 in the first step. In the peeling method of one embodiment of the present invention, excellent handleability of the process member 80 which is kept even after irradiation with the light 240 allows the above transfer.

<Third Step>

The transfer mechanism 331 transfers the first remaining portion 80a. The first cleaning device 350 cleans the first remaining portion 80a supplied thereto.

The transfer mechanism 331 transfers the first remaining portion 80a which has been cleaned and supplies the first remaining portion 80a to the first bonding unit 400. The support body supply unit 500 supplies the first support body 71 to the first bonding unit 400.

Note that the transfer mechanism 331 may supply the first remaining portion 80a from the first separation unit 300 directly to the first bonding unit 400 without supplying it to the first cleaning device 350.

Also in the case where the stack manufacturing apparatus 1000A does not include the first cleaning device 350, the first remaining portion 80a is supplied from the first separation unit 300 directly to the first bonding unit 400 (see FIG. 15).

The first bonding unit 400 forms the first adhesive layer 231 on the first remaining portion 80a supplied thereto (see FIG. 13D), and bonds the first remaining portion 80a and the first support body 71 to each other with the first adhesive layer 231 (see FIG. 13E).

By this step, the stack 81 is obtained from the first remaining portion 80a. Specifically, the stack 81 is provided with the first support body 71, the first adhesive layer 231, the first resin layer 213, the bonding layer 230, and the second substrate 225.

<Fourth Step>

The transfer mechanism 331 transfers the stack 81, and the stack 81 is supplied to the first supply unit 310 also serving as the first unloading unit.

After this step, the stack 81 can be unloaded.

<Another Step>

Note that when it takes time to cure the first adhesive layer 231, it is preferable that the stack 81 in which the first adhesive layer is not cured yet be unloaded and the first adhesive layer 231 be cured outside the stack manufacturing apparatus 1000A, in which case occupancy time of the apparatus can be reduced.

The stack that can be manufactured according to this embodiment is not limited to that illustrated in FIGS. 13A to 13E. Another manufacturing example of a stack which is different from that illustrated in FIGS. 13A to 13E is described below with reference to FIGS. 14A to 14E.

FIGS. 14A to 14E are schematic views illustrating a process for manufacturing a stack with the use of the stack manufacturing apparatus 1000A. FIGS. 14A, 14D, and 14E each illustrate a plan view and a cross-sectional view taken along dashed-dotted line X1-X2 in the plan view. FIGS. 14B and 14C each illustrate only a cross-sectional view.

[Method for Manufacturing Stack]

A method for manufacturing the stack 81 from the process member 80 with the use of the stack manufacturing apparatus 1000A is described below with reference to FIG. 12 and FIGS. 14A to 14E.

The process member 80 includes the first substrate 211, a first resin layer 213b whose one surface is in contact with the first substrate 211, a bonding layer 230b whose one surface is in contact with the other surface of the first resin layer 213b, and the second substrate 225 in contact with the other of the surface of the bonding layer 230b (see FIG. 14A). The process member 80 is different from the process member illustrated in FIG. 13A in the shapes of the resin layer and the bonding layer.

<First Step>

The process member 80 is loaded into the first supply unit 310. The first supply unit 310 supplies the process member 80, and the transfer mechanism 331 transfers the process member 80 and supplies the process member 80 to the first separation unit 300.

<Second Step>

The first separation unit 300 peels the first substrate 211 serving as the one surface layer 80b of the process member 80 with the use of the light 240 and the blade 241 (see FIGS. 14B and 14C). Refer to the peeling method of one embodiment of the present invention described in Embodiment 1 for specific process of the second step. Note that suction pads may be used instead of the blade 241.

By this step, the first remaining portion 80a is obtained from the process member 80. Specifically, the first remaining portion 80a includes the first resin layer 213b, the bonding layer 230b whose one surface is in contact with the first resin layer 213b, and the second substrate 225 in contact with the other surface of the bonding layer 230b.

Note that in the case where the first separation unit 300 does not include a laser device for irradiation with the light 240, the process member 80 is irradiated with the light 240 outside the stack manufacturing apparatus 1000A and then transferred to the first supply unit 310 in the first step. In the peeling method of one embodiment of the present invention, excellent handleability of the process member 80 which is kept even after irradiation with the light 240 allows the above transfer.

<Third Step>

The transfer mechanism 331 transfers the first remaining portion 80a. The first cleaning device 350 cleans the first remaining portion 80a supplied thereto.

The transfer mechanism 331 transfers the first remaining portion 80a which has been cleaned and supplies the first remaining portion 80a to the first bonding unit 400. The support body supply unit 500 supplies the first support body 71 to the first bonding unit 400.

Note that the transfer mechanism 331 may supply the first remaining portion 80a from the first separation unit 300 directly to the first bonding unit 400 without supplying it to the first cleaning device 350.

Also in the case where the stack manufacturing apparatus 1000A does not include the first cleaning device 350, the first remaining portion 80a is supplied from the first separation unit 300 directly to the first bonding unit 400 (see FIG. 15).

The first bonding unit 400 forms the first adhesive layer 231 on the first remaining portion 80a supplied thereto (see FIG. 14D), and bonds the first remaining portion 80a and the first support body 71 to each other with the first adhesive layer 231 (see FIG. 14E).

By this step, the stack 81 is obtained from the first remaining portion 80a. Specifically, the stack 81 is provided with the first support body 71, the first adhesive layer 231, the first resin layer 213b, the bonding layer 230b, and the second substrate 225.

<Fourth Step>

The transfer mechanism 331 transfers the stack 81, and the stack 81 is supplied to the first supply unit 310 also serving as the first unloading unit.

After this step, the stack 81 can be unloaded.

<Another Step>

Note that when it takes time to cure the first adhesive layer 231, it is preferable that the stack 81 in which the first adhesive layer 231 is not cured yet be unloaded and the first adhesive layer 231 be cured outside the stack manufacturing apparatus 1000A, in which case occupancy time of the apparatus can be reduced.

This embodiment can be combined with any of other embodiments as appropriate.

Embodiment 5

In this embodiment, a stack manufacturing apparatus different from the stack manufacturing apparatus 1000A described in Embodiment 4 is described with reference to FIG. 16, FIGS. 17A to 17E, and FIGS. 18A to 18D.

The stack manufacturing apparatus includes a first supply unit that supplies a process member having a sheet-like shape, a first separation unit that is supplied with the process member and divides the process member into one surface layer and a first remaining portion, a support body supply unit that supplies a first support body and a second support body each having a sheet-like shape, a first bonding unit that is supplied with the first remaining portion and the first support body and bonds the first remaining portion and the first support body to each other with a first adhesive layer, a first unloading unit that unloads a first stack including the first remaining portion, the first adhesive layer, and the first support body, a second supply unit that supplies the first stack, a second separation unit that is supplied with the first stack and divides the first stack into one surface layer and a second remaining portion, a second bonding unit that is supplied with the second remaining portion and the second support body and bonds the second remaining portion and the second support body to each other with a second adhesive layer, and a second unloading unit that unloads a second stack including the second remaining portion, the second adhesive layer, and the second support body. In at least one of the first separation unit and the second separation unit, peeling of the support substrate (substrate) is performed as described in Embodiment 1.

The stack manufacturing apparatus having the above structure manufactures a stack with the use of the sheet-like process member supplied to the first supply unit. The first separation unit divides the process member into the one surface layer and the first remaining portion. The first bonding unit bonds the first remaining portion and the first support body supplied from the support body supply unit to each other with the first adhesive layer. Then, the first unloading unit unloads the first stack including the first remaining portion, the first adhesive layer, and the first support body, and supplies the first stack to the second supply unit. The second separation unit divides the first stack into the one surface layer and the second remaining portion. The second bonding unit bonds the second remaining portion and the second support body supplied from the support body supply unit to each other with the second adhesive layer. Then, the second unloading unit unloads the second stack including the second remaining portion, the second adhesive layer, and the second support body.

Figure 16:
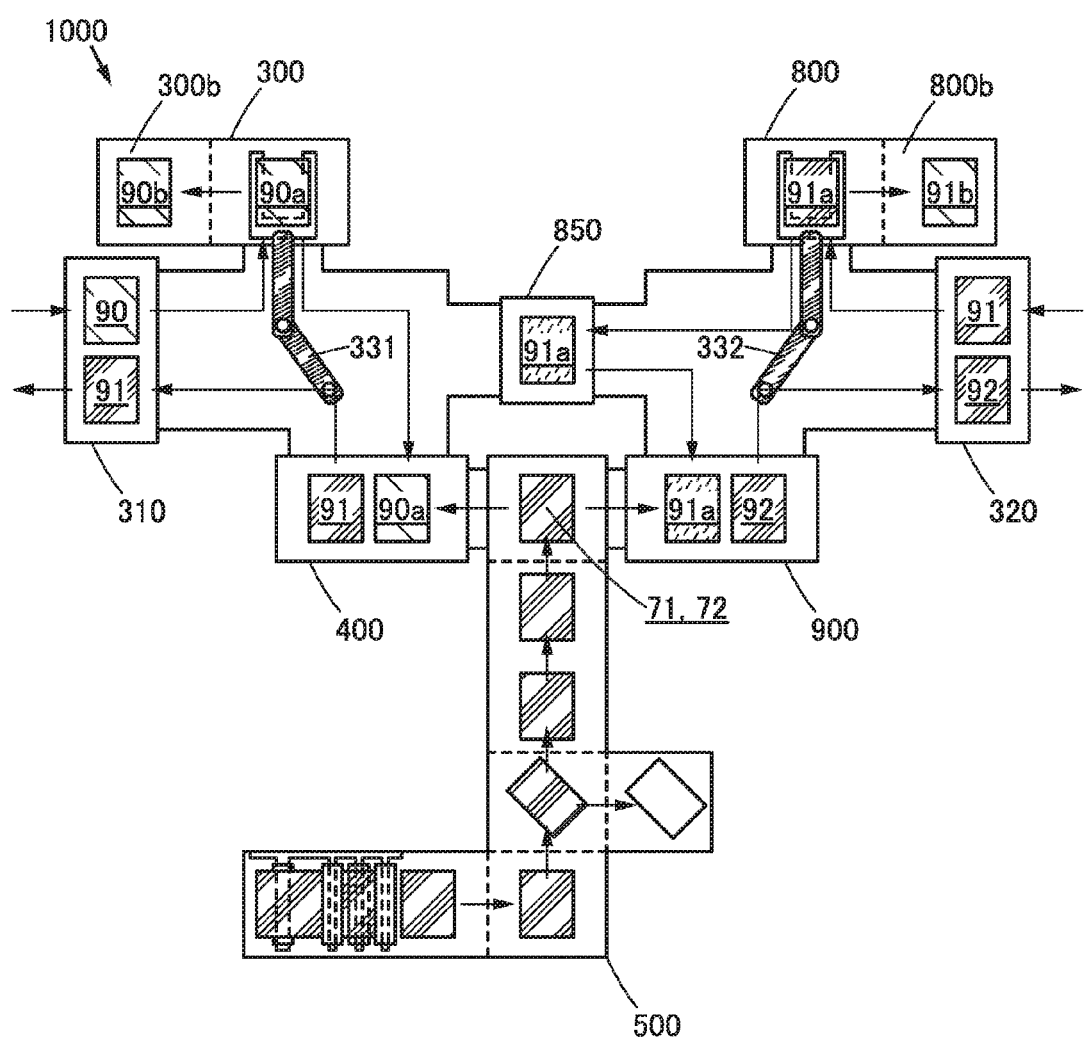
FIG. 16 illustrates a stack manufacturing apparatus.

FIG. 16 is a schematic diagram illustrating a structure of a stack manufacturing apparatus 1000 and a transfer path of a process member and a stack in a process.

FIGS. 17A to 17E and FIGS. 18A to 18D are schematic views illustrating a process for manufacturing a stack with the use of the stack manufacturing apparatus 1000. FIGS. 17A, 17D, and 17E and FIGS. 18C and 18D each illustrate a plan view and a cross-sectional view taken along dashed-dotted line Y1-Y2 in the plan view. FIGS. 17B and 17C and FIGS. 18A and 18B each illustrate only a cross-sectional view.

The stack manufacturing apparatus 1000 described in this embodiment includes the first supply unit 310, the first separation unit 300, the first bonding unit 400, the support body supply unit 500, a second supply unit 320, a second separation unit 800, and a second bonding unit 900.

Note that each unit can be named freely, and the name does not limit the function of each unit.

In at least one of the first separation unit 300 and the second separation unit 800, peeling of the support substrate (substrate) is performed as described in Embodiment 1.

The first supply unit 310 can supply a process member 90. Note that the first supply unit 310 can also serve as a first unloading unit.

The first separation unit 300 can separate a first remaining portion 90a and the first substrate 211 serving as one surface layer 90b of the process member 90 from each other (see FIG. 16 and FIGS. 17A to 17C).

The first bonding unit 400 is supplied with the first remaining portion 90a and the first support body 71. In the first bonding unit 400, the first support body 71 and the first remaining portion 90a are bonded to each other with the first adhesive layer 231 (see FIG. 16 and FIGS. 17D and 17E).

The support body supply unit 500 supplies the first support body 71 and a second support body 72 (see FIG. 16).

The first supply unit 310 also serving as the first unloading unit can unload a stack 91 including the first remaining portion 90a, the first adhesive layer 231, and the first support body 71 (see FIG. 16 and FIG. 17E).

The second supply unit 320 can supply the stack 91. Note that the second supply unit 320 can also serve as a second unloading unit.

The second separation unit 800 separates a second remaining portion 91a and a second substrate 225 serving as one surface layer 91b of the stack 91 from each other (see FIGS. 18A and 18B).

The second support body 72 is supplied to the second bonding unit 900, and the second support body 72 and the second remaining portion 91a are bonded to each other with a second adhesive layer 232 in the second bonding unit 900 (see FIGS. 18C and 18D).

The second supply unit 320 also serving as the second unloading unit unloads a stack 92 including the second remaining portion 91a, the second adhesive layer 232, and the second support body 72 (see FIG. 16 and FIG. 18D).

The stack manufacturing apparatus 1000 includes the first supply unit 310 that supplies the process member 90 and also serves as the first unloading unit for unloading the stack 91, the first separation unit 300 that separates the one surface layer 90b and the first remaining portion 90a of the process member 90 from each other, the first bonding unit 400 that bonds the first support body 71 to the first remaining portion 90a, the support body supply unit 500 that supplies the first support body 71 and the second support body 72, the second supply unit 320 that supplies the stack 91 and unloads the stack 92, the second separation unit 800 that separates the one surface layer 91b and the second remaining portion 91a of the stack 91 from each other, and the second bonding unit 900 that bonds the second support body 72 to the second remaining portion 91a. This structure makes it possible to peel both surface layers of the process member 90 and bond the first support body 71 and the second support body 72 to the remaining portion. As described above, the peeling method of one embodiment of the present invention is employed in part of the stack manufacturing apparatus 1000, whereby the stack manufacturing apparatus 1000 for manufacturing a stack including a support body and a remaining portion of a process member can be provided.

Furthermore, the stack manufacturing apparatus 1000 described in this embodiment includes the first storage portion 300b, a second storage portion 800b, a second cleaning device 850, the transfer mechanism 331, a transfer mechanism 332, and the like.

The first storage portion 300b stores the one surface layer 90b peeled from the process member 90.

The second storage portion 800b stores the one surface layer 91b peeled from the stack 91.

The second cleaning device 850 cleans the second remaining portion 91*a* obtained from the stack 91.

The transfer mechanism 331 transfers the process member 90, the first remaining portion 90*a* separated from the process member 90, and the stack 91.

The transfer mechanism 332 transfers the stack 91, the second remaining portion 91*a* separated from the stack 91, and the stack 92.

[Stack Manufacturing Apparatus]

Individual components of the stack manufacturing apparatus 1000 are described below.

Note that the stack manufacturing apparatus 1000 differs from the stack manufacturing apparatus 1000A described in Embodiment 4 in including the second supply unit 320, the second separation unit 800, the second bonding unit 900, the second storage portion 800*b*, and the second cleaning device 850. In this embodiment, a structure different from that of the stack manufacturing apparatus 1000A is described, and the description in Embodiment 4 is referred to for a structure similar to that of the stack manufacturing apparatus 1000A.

<Second Supply Unit>

The second supply unit 320 can have a structure similar to that of the first supply unit 310 described in Embodiment 3 except that the second supply unit 320 supplies the stack 91 (i.e., it supplies a different object from the first supply unit 310).

The second supply unit 320 in this embodiment also serves as the second unloading unit. The second unloading unit can have a structure similar to that of the first unloading unit described in Embodiment 3 except that the second unloading unit unloads the stack 92 (i.e., it unloads a different object from the first unloading unit).

<Second Separation Unit>

The second separation unit 800 can have a structure similar to that of the first separation unit 300 described in Embodiment 4. Note that the second separation unit 800 does not necessarily include the laser device. In that case, the laser device is provided outside the stack manufacturing apparatus 1000.

<Second Bonding Unit>

The second bonding unit 900 includes a mechanism for forming the second adhesive layer 232 and a crimp mechanism for bonding the second remaining portion 91*a* and the second support body 72 to each other with the use of the second adhesive layer 232.

The mechanism for forming the second adhesive layer 232 can have a structure similar to that of the first bonding unit 400 described in Embodiment 4, for example.

Note that the second adhesive layer 232 may be formed on the second remaining portion 91*a* and/or the second support body 72. Specifically, the second support body 72 on which the second adhesive layer 232 is formed in advance may be used.

The crimp mechanism for bonding the second remaining portion 91*a* and the second support body 72 to each other can have a structure similar to that of the first bonding unit 400 described in Embodiment 4, for example.

[Method for Manufacturing Stack]

A method for manufacturing the stack 92 from the process member 90 with the use of the stack manufacturing apparatus 1000 is described below with reference to FIG. 16, FIGS. 17A to 17E, and FIGS. 18A to 18D.

The process member 90 has the same structure as the process member 80 except that a second resin layer 223 is provided between the second substrate 225 and the bonding layer 230.

Specifically, the process member 90 includes the first substrate 211, the first resin layer 213 whose one surface is in contact with the first substrate 211, the bonding layer 230 whose one surface is in contact with the other surface of the first resin layer 213, the second resin layer 223 whose one surface is in contact with the other surface of the bonding layer 230, and the second substrate 225 whose one surface is in contact with the other surface of the second resin layer 223 (see FIG. 17A). The first resin layer 213 includes the openings 220, and the second resin layer 223 includes openings 221.

Note that the example where the end portion of the bonding layer 230 is positioned on the inner side than the end portion of the first substrate 211 in the process member 80 in the top view is described in Embodiment 4, whereas in this embodiment, an example where the end portion of the first substrate 211 and the end portion of the bonding layer 230 are substantially aligned with each other in the process member 90 is described.

<First Step>

The process member 90 is loaded into the first supply unit 310. The first supply unit 310 supplies the process member 90, and the transfer mechanism 331 transfers the process member 90 and supplies the process member 90 to the first separation unit 300.

<Second Step>

The first separation unit 300 peels the first substrate 211 serving as the one surface layer 90*b* of the process member 90 with the use of the light 240 and the blade 241 (see FIGS. 17B and 17C). Refer to the peeling method of one embodiment of the present invention described in Embodiment 1 for specific process of the second step. Note that suction pads may be used instead of the blade 241.

By this step, the first remaining portion 90*a* is obtained from the process member 90. Specifically, the first remaining portion 90*a* includes the first resin layer 213, the bonding layer 230 whose one surface is in contact with the other surface of the first resin layer 213, the second resin layer 223 whose one surface is in contact with the other surface of the bonding layer 230, and the second substrate 225 whose one surface is in contact with the other surface of the second resin layer 223.

Note that in the case where the first separation unit 300 does not include a laser device for irradiation with the light 240, the process member 90 is irradiated with the light 240 outside the stack manufacturing apparatus 1000 and then transferred to the first supply unit 310 in the first step. In the peeling method of one embodiment of the present invention, excellent handleability of the process member 90 which is kept even after irradiation with the light 240 allows the above transfer.

<Third Step>

The transfer mechanism 331 transfers the first remaining portion 90*a* and supplies the first remaining portion 90*a* to the first bonding unit 400. The support body supply unit 500 supplies the first support body 71 to the first bonding unit 400.

Note that in the case where the stack manufacturing apparatus 1000 includes the first cleaning device 350 described in Embodiment 4, after the transfer mechanism 331 supplies the first remaining portion 90*a* to the first cleaning device 350, and the first cleaning device 350 cleans the first remaining portion 90*a*, the first remaining portion 90*a* may be supplied to the first bonding unit 400.

The first bonding unit 400 forms the first adhesive layer 231 over the first remaining portion 90*a* supplied thereto (see FIG. 17D), and bonds the first remaining portion 90a and the first support body 71 to each other with the first adhesive layer 231.

By this step, the stack 91 is obtained using the first remaining portion 90a. Specifically, the stack 91 includes the first support body 71, the first adhesive layer 231 whose one surface is in contact with the first support body 71, the first resin layer 213 whose one surface is in contact with the other surface of the first adhesive layer 231, the bonding layer 230 whose one surface is in contact with the other surface of the first resin layer 213, the second resin layer 223 whose one surface is in contact with the other surface of the bonding layer 230, and the second substrate 225 whose one surface is in contact with the other surface of the second resin layer 223 (see FIG. 17E).

<Fourth Step>

The transfer mechanism 331 transfers the stack 91, and the stack 91 is supplied to the first supply unit 310 also serving as the first unloading unit.

After this step, the stack 91 can be unloaded. For example, when it takes time to cure the first adhesive layer 231, it is possible that the stack 91 in which the first adhesive layer 231 is not cured yet is unloaded and the first adhesive layer 231 is cured outside the stack manufacturing apparatus 1000. Thus, occupancy time of the apparatus can be reduced.

<Fifth Step>

The stack 91 is loaded into the second supply unit 320. The second supply unit 320 supplies the stack 91, and the transfer mechanism 332 transfers the stack 91 and supplies the stack 91 to the second separation unit 800.

<Sixth Step>

The second separation unit 800 peels the second substrate 225 serving as the one surface layer 91b of the stack 91 with the use of the light 240 and the blade 241 (see FIGS. 18A and 18B). Refer to the peeling method of one embodiment of the present invention described in Embodiment 1 for specific process of the sixth step. At this time, before irradiation with the light 240, the stack 91 is turned upside down so that the second substrate 225 faces upward. In addition, after irradiation with the light 240 and before insertion of the blade 241, the stack 91 is preferably turned upside down so that the second substrate 225 faces downward. Note that suction pads may be used instead of the blade 241.

By this step, the second remaining portion 91a is obtained from the stack 91. Specifically, the second remaining portion 91a includes the first support body 71, the first adhesive layer 231 whose one surface is in contact with the first support body 71, the first resin layer 213 whose one surface is in contact with the other surface of the first adhesive layer 231, the bonding layer 230 whose one surface is in contact with the other surface of the first resin layer 213, and the second resin layer 223 whose one surface is in contact with the other surface of the bonding layer 230.

Note that in the case where the second separation unit 800 does not include a laser device for irradiation with the light 240, the stack 91 is irradiated with the light 240 outside the stack manufacturing apparatus 1000 and then transferred to the second supply unit 320 in the fifth step. In the peeling method of one embodiment of the present invention, excellent handleability of the stack 91 which is kept even after irradiation with the light 240 allows the above transfer.

<Seventh Step>

The transfer mechanism 332 transfers the second remaining portion 91a, and turns the second remaining portion 91a upside down so that the second resin layer 223 faces upward. In the second cleaning device 850, the second remaining portion 91a that has been supplied is cleaned.

The transfer mechanism 332 transfers the second remaining portion 91a after the cleaning and supplies the second remaining portion 91a to the second bonding unit 900. The support body supply unit 500 supplies the second support body 72 to the second bonding unit 900.

Note that the transfer mechanism 332 may supply the second remaining portion 91a from the second separation unit 800 directly to the second bonding unit 900 without supplying it to the second cleaning device 850.

Figure 21:
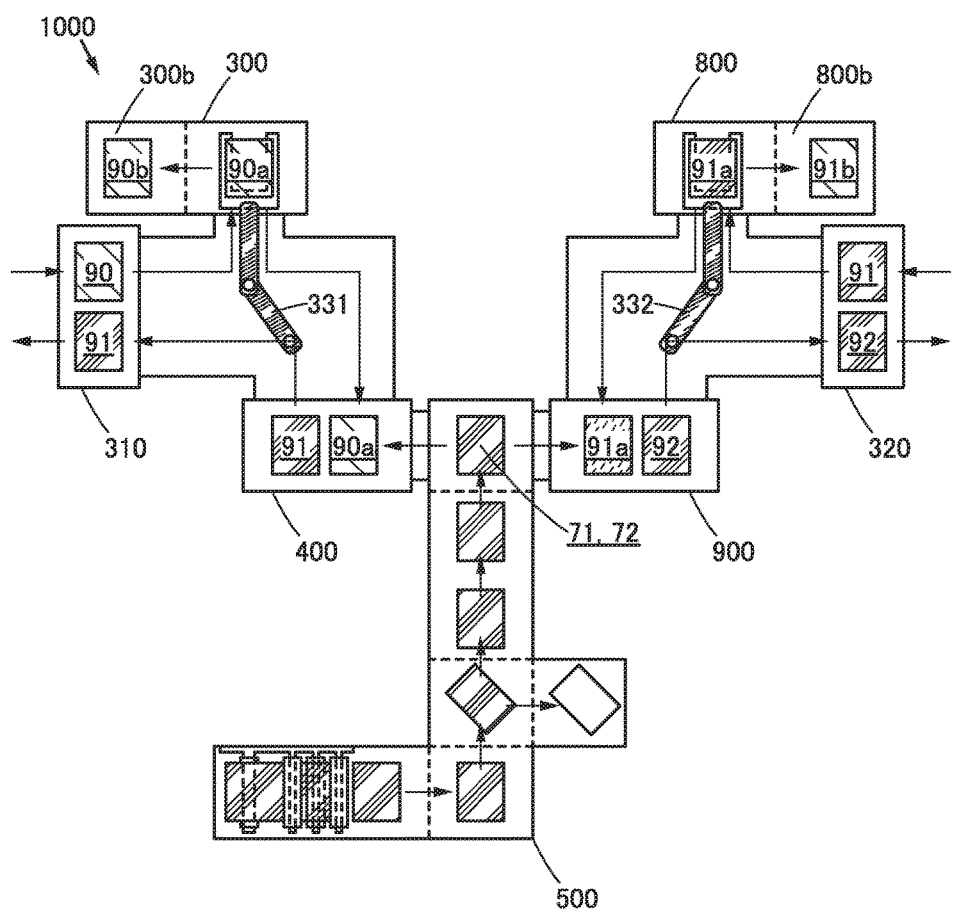
FIG. 21 illustrates a stack manufacturing apparatus.

Also in the case where the stack manufacturing apparatus 1000 does not include the second cleaning device 850, the second remaining portion 91a is supplied from the second separation unit 800 directly to the second bonding unit 900 (see FIG. 21).

The second bonding unit 900 forms the second adhesive layer 232 on the second remaining portion 91a supplied thereto (see FIG. 18C), and bonds the second remaining portion 91a and the second support body 72 to each other with the second adhesive layer 232 (see FIG. 18D).

By this step, the stack 92 is obtained from the second remaining portion 91a. Specifically, the stack 92 is provided with the first support body 71, the first adhesive layer 231, the first resin layer 213, the bonding layer 230, the second resin layer 223, the second adhesive layer 232, and the second support body 72.

<Eighth Step>

The transfer mechanism 332 transfers the stack 92, and the stack 92 is supplied to the second supply unit 320 also serving as the second unloading unit.

After this step, the stack 92 can be unloaded.

The stack that can be manufactured according to this embodiment is not limited to that illustrated in FIGS. 17A to 17E and FIGS. 18A to 18D. Another manufacturing example of a stack which is different from that illustrated in FIGS. 17A to 17E and FIGS. 18A to 18D is described below with reference to FIGS. 19A to 19E and FIGS. 20A to 20D.

FIGS. 19A to 19E and FIGS. 20A to 20D are schematic views illustrating a process for manufacturing a stack with the use of the stack manufacturing apparatus 1000. FIGS. 19A, 19D, and 19E, and FIGS. 20C and 20D each illustrate a plan view and a cross-sectional view taken along dashed-dotted line Y1-Y2 in the plan view. FIGS. 19B and 19C and FIGS. 20A and 20B each illustrate only a cross-sectional view.

[Method for Manufacturing Stack]

A method for manufacturing the stack 92 from the process member 90 with the use of the stack manufacturing apparatus 1000 is described below with reference to FIG. 16, FIGS. 19A to 19E, and FIGS. 20A to 20D.

The process member 90 has the same structure as the process member 80 except that a second resin layer 223b is provided between the second substrate 225 and the bonding layer 230b.

Specifically, the process member 90 includes the first substrate 211, the first resin layer 213b whose one surface is in contact with the first substrate 211, the bonding layer 230b whose one surface is in contact with the other surface of the first resin layer 213b, the second resin layer 223b whose one surface is in contact with the other surface of the bonding layer 230b, and the second substrate 225 whose one surface is in contact with the other surface of the second resin layer 223b (see FIG. 19A). The process member 90 is different from the process member illustrated in FIGS. 17A to 17E in the shape of the resin layer and the shape of the bonding layer.

Note that the example where the end portion of the bonding layer 230b is positioned on the inner side than the end portion of the first substrate 211 in the process member 80 in the top view is described in Embodiment 4, whereas in this embodiment, an example where the end portion of the first substrate 211 and the end portion of the bonding layer 230b are substantially aligned with each other in the process member 90 is described.

<First Step>

The process member 90 is loaded into the first supply unit 310. The first supply unit 310 supplies the process member 90, and the transfer mechanism 331 transfers the process member 90 and supplies the process member 90 to the first separation unit 300.

<Second Step>

The first separation unit 300 peels the first substrate 211 serving as the one surface layer 90b of the process member 90 with the use of the light 240 and the blade 241 (see FIGS. 19B and 19C). Refer to the peeling method of one embodiment of the present invention described in Embodiment 1 for specific process of the second step. Note that suction pads may be used instead of the blade 241.

By this step, the first remaining portion 90a is obtained from the process member 90. Specifically, the first remaining portion 90a includes the first resin layer 213b, the bonding layer 230b whose one surface is in contact with the other surface of the first resin layer 213b, the second resin layer 223b whose one surface is in contact with the other surface of the bonding layer 230b, and the second substrate 225 whose one surface is in contact with the other surface of the second resin layer 223b.

Note that in the case where the first separation unit 300 does not include a laser device for irradiation with the light 240, the process member 90 is irradiated with the light 240 outside the stack manufacturing apparatus 1000 and then transferred to the first supply unit 310 in the first step. In the peeling method of one embodiment of the present invention, excellent handleability of the process member 90 which is kept even after irradiation with the light 240 allows the above transfer.

<Third Step>

The transfer mechanism 331 transfers the first remaining portion 90a and supplies the first remaining portion 90a to the first bonding unit 400. The support body supply unit 500 supplies the first support body 71 to the first bonding unit 400.

Note that in the case where the stack manufacturing apparatus 1000 includes the first cleaning device 350 described in Embodiment 2, after the transfer mechanism 331 supplies the first remaining portion 90a to the first cleaning device 350, and the first cleaning device 350 cleans the first remaining portion 90a, the first remaining portion 90a may be supplied to the first bonding unit 400.

The first bonding unit 400 forms the first adhesive layer 231 over the first remaining portion 90a supplied thereto (see FIG. 19D), and bonds the first remaining portion 90a and the first support body 71 to each other with the first adhesive layer 231.

By this step, the stack 91 is obtained from the first remaining portion 90a. Specifically, the stack 91 includes the first support body 71, the first adhesive layer 231 whose one surface is in contact with the first support body 71, the first resin layer 213b whose one surface is in contact with the other surface of the first adhesive layer 231, the bonding layer 230b whose one surface is in contact with the other surface of the first resin layer 213b, the second resin layer 223b whose one surface is in contact with the other surface of the bonding layer 230b, and the second substrate 225 whose one surface is in contact with the other surface of the second resin layer 223b (see FIG. 19E).

<Fourth Step>

The transfer mechanism 331 transfers the stack 91, and the stack 91 is supplied to the first supply unit 310 also serving as the first unloading unit.

After this step, the stack 91 can be unloaded. For example, when it takes time to cure the first adhesive layer 231, it is possible that the stack 91 in which the first adhesive layer 231 is not cured yet is unloaded and the first adhesive layer 231 is cured outside the stack manufacturing apparatus 1000. Thus, occupancy time of the apparatus can be reduced.

<Fifth Step>

The stack 91 is loaded into the second supply unit 320. The second supply unit 320 supplies the stack 91, and the transfer mechanism 332 transfers the stack 91 and supplies the stack 91 to the second separation unit 800.

<Sixth Step>

The second separation unit 800 peels the second substrate 225 serving as the one surface layer 91b of the stack 91 with the use of the light 240 and the blade 241 (see FIGS. 20A and 20B). Refer to the peeling method of one embodiment of the present invention described in Embodiment 1 for specific process of the sixth step. At this time, before irradiation with the light 240, the stack 91 is turned upside down so that the second substrate 225 faces upward. In addition, after irradiation with the light 240 and before insertion of the blade 241, the stack 91 is preferably turned upside down so that the second substrate 225 faces downward. Note that suction pads may be used instead of the blade 241.

By this step, the second remaining portion 91a is obtained from the stack 91. Specifically, the second remaining portion 91a includes the first support body 71, the first adhesive layer 231 whose one surface is in contact with the first support body 71, the first resin layer 213b whose one surface is in contact with the other surface of the first adhesive layer 231, the bonding layer 230b whose one surface is in contact with the other surface of the first resin layer 213b, and the second resin layer 223b whose one surface is in contact with the other surface of the bonding layer 230b Note that in the case where the second separation unit 800 does not include a laser device for irradiation with the light 240, the stack 91 is irradiated with the light 240 outside the stack manufacturing apparatus 1000 and then transferred to the second supply unit 320 in the fifth step. In the peeling method of one embodiment of the present invention, excellent handleability of the stack 91 which is kept even after irradiation with the light 240 allows the above transfer.

<Seventh Step>

The transfer mechanism 332 transfers the second remaining portion 91a, and turns the second remaining portion 91a upside down so that the second resin layer 223b faces upward. In the second cleaning device 850, the second remaining portion 91a that has been supplied is cleaned.

The transfer mechanism 332 transfers the second remaining portion 91a after the cleaning and supplies the second remaining portion 91a to the second bonding unit 900. The support body supply unit 500 supplies the second support body 72 to the second bonding unit 900.

Note that the transfer mechanism 332 may supply the second remaining portion 91a from the second separation unit 800 directly to the second bonding unit 900 without supplying it to the second cleaning device 850.

Also in the case where the stack manufacturing apparatus 1000 does not include the second cleaning device 850, the second remaining portion 91*a* is supplied from the second separation unit 800 directly to the second bonding unit 900 (see FIG. 21).

The second bonding unit 900 forms the second adhesive layer 232 on the second remaining portion 91*a* supplied thereto (see FIG. 20C), and bonds the second remaining portion 91*a* and the second support body 72 to each other with the second adhesive layer 232 (see FIG. 20D).

By this step, the stack 92 is obtained from the second remaining portion 91*a*. Specifically, the stack 92 is provided with the first support body 71, the first adhesive layer 231, the first resin layer 213*b*, the bonding layer 230*b*, the second resin layer 223*b*, the second adhesive layer 232, and the second support body 72.

<Eighth Step>

The transfer mechanism 332 transfers the stack 92, and the stack 92 is supplied to the second supply unit 320 also serving as the second unloading unit.

After this step, the stack 92 can be unloaded.

This embodiment can be combined with any of other embodiments as appropriate.

Embodiment 6

In this embodiment, a display module and electronic devices which include flexible devices that can be manufactured by the method described in Embodiment 3 are described with reference to FIG. 22 and FIGS. 23A to 23F.

Figure 22:
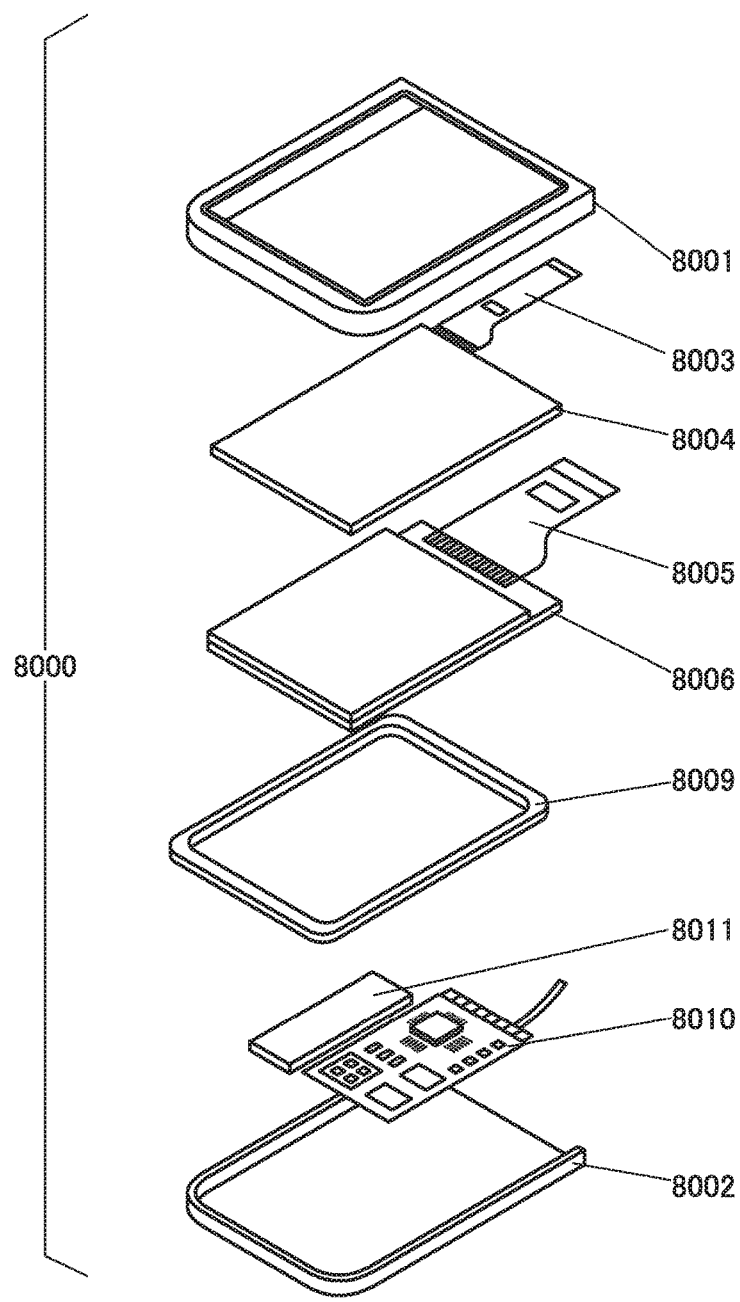
FIG. 22 illustrates an example of a display module.

In a display module 8000 in FIG. 22, a touch panel 8004 connected to an FPC 8003, a display panel 8006 connected to an FPC 8005, a frame 8009, a printed circuit board 8010, and a battery 8011 are provided between an upper cover 8001 and a lower cover 8002.

The flexible device described in Embodiment 3 can be used for the display panel 8006, for example.

The shapes and sizes of the upper cover 8001 and the lower cover 8002 can be changed as appropriate in accordance with the sizes of the touch panel 8004 and the display panel 8006.

The touch panel 8004 can be a resistive touch panel or a capacitive touch panel and may be formed to overlap with the display panel 8006. Instead of providing the touch panel 8004, the display panel 8006 can have a touch panel function.

The frame 8009 protects the display panel 8006 and also functions as an electromagnetic shield for blocking electromagnetic waves generated by the operation of the printed circuit board 8010. The frame 8009 may function as a radiator plate.

The printed circuit board 8010 has a power supply circuit and a signal processing circuit for outputting a video signal and a clock signal. As a power source for supplying power to the power supply circuit, an external commercial power source or the battery 8011 provided separately may be used. The battery 8011 can be omitted in the case of using a commercial power source.

At least one of the upper cover 8001, the lower cover 8002, the touch panel 8004, the frame 8009, the printed circuit board 8010, and the battery 8011 preferably has flexibility.

The display module 8000 can be additionally provided with a member such as a polarizing plate, a retardation plate, or a prism sheet.

One embodiment of the present invention makes it possible to provide highly reliable electronic devices with curved surfaces. In addition, one embodiment of the present invention makes it possible to provide flexible and highly reliable electronic devices.

Examples of electronic devices include a television set, a desktop or laptop personal computer, a monitor of a computer or the like, a digital camera, a digital video camera, a digital photo frame, a mobile phone, a portable game machine, a portable information terminal, an audio reproducing device, and a large game machine such as a pachinko machine.

The electronic device that can be manufactured with the use of one embodiment of the present invention can be incorporated along a curved inside/outside wall surface of a house or a building or a curved interior/exterior surface of a car.

Furthermore, the electronic device that can be manufactured with the use of one embodiment of the present invention may include a secondary battery. Preferably, the secondary battery is capable of being charged by contactless power transmission.

Examples of the secondary battery include a lithium-ion secondary battery such as a lithium polymer battery (lithium ion polymer battery) using a gel electrolyte, a nickel-hydride battery, a nickel-cadmium battery, an organic radical battery, a lead-acid battery, an air secondary battery, a nickel-zinc battery, and a silver-zinc battery.

The electronic device that can be manufactured with the use of one embodiment of the present invention may include an antenna. When a signal is received by the antenna, an image, data, or the like can be displayed on a display portion. When the electronic device includes the antenna and a secondary battery, the antenna may be used for contactless power transmission.

The electronic device that can be manufactured with the use of one embodiment of the present invention may include a sensor (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays).

The electronic device that can be manufactured with the use of one embodiment of the present invention can have a variety of functions, for example, a function of displaying a variety of information (e.g., a still image, a moving image, and a text image) on a display portion, a touch panel function, a function of displaying a calendar, date, time, and the like, a function of executing a variety of software (programs), a wireless communication function, and a function of reading a program or data stored in a recording medium.

Furthermore, the electronic device including a plurality of display portions can have a function of displaying image information mainly on one display portion while displaying text information mainly on another display portion, a function of displaying a three-dimensional image by displaying images where parallax is considered on a plurality of display portions, or the like. Furthermore, the electronic device including an image receiving portion can have a function of taking a still image or a moving image, a function of automatically or manually correcting a photographed image, a function of storing a photographed image in a recording medium (an external recording medium or a recording medium incorporated in the electronic device), a function of displaying a photographed image on a display portion, or the like. Note that the functions of the electronic device of one embodiment of the present invention are not limited thereto, and the electronic devices can have a variety of functions.

Figure 23A:
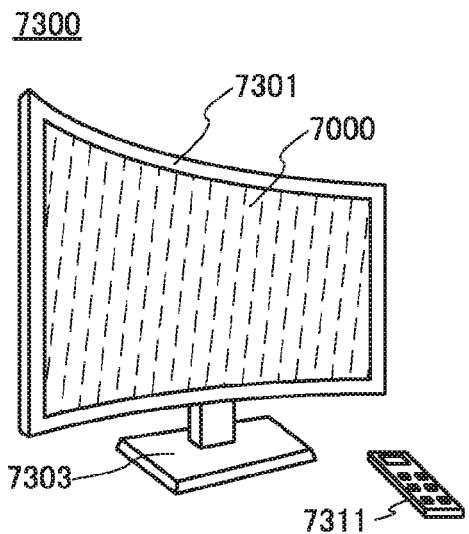
FIGS. 23A to 23F each illustrate an example of electronic device.
Figure 23B:
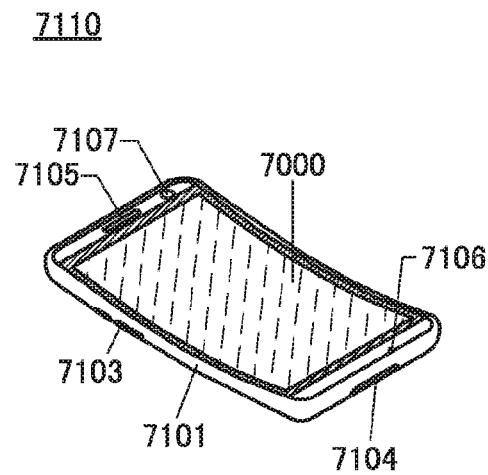
Figure 23C:
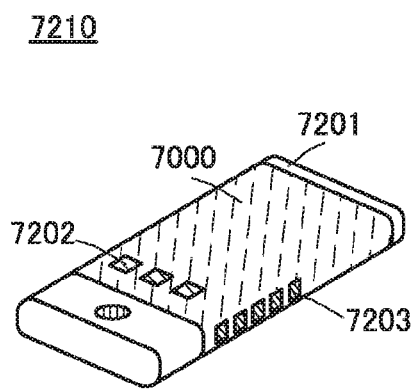

FIGS. 23A to 23C illustrate examples of an electronic device including a display portion 7000 with a curved surface. The display surface of the display portion 7000 is bent, and images can be displayed on the bent display surface. The display portion 7000 may have flexibility.

The flexible device that can be formed in accordance with one embodiment of the present invention can be used in the display portion 7000. One embodiment of the present invention makes it possible to provide a highly reliable electronic device with a curved display portion.

FIG. 23A illustrates an example of a television set. In a television set 7300, the display portion 7000 is incorporated into a housing 7301. Here, the housing 7301 is supported by a stand 7303.

The television set 7300 illustrated in FIG. 23A can be operated with an operation switch of the housing 7301 or a separate remote controller 7311. The display portion 7000 may include a touch sensor, and can be operated by touch on the display portion 7000 with a finger or the like. The remote controller 7311 may be provided with a display portion for displaying data output from the remote controller 7311. With operation keys or a touch panel of the remote controller 7311, channels and volume can be controlled and images displayed on the display portion 7000 can be controlled.

Note that the television set 7300 is provided with a receiver, a modem, and the like. A general television broadcast can be received with the receiver. When the television set is connected to a communication network with or without wires via the modem, one-way (from a transmitter to a receiver) or two-way (between a transmitter and a receiver or between receivers) data communication can be performed.

FIG. 23B illustrates an example of a mobile phone. A mobile phone 7110 illustrated in FIG. 23B includes a housing 7101, the display portion 7000, operation buttons 7103, an external connection port 7104, a speaker 7105, a microphone 7106, a camera 7107, and the like.

The mobile phone 7110 includes a touch sensor in the display portion 7000. Operations such as making a call and inputting text can be performed by touch on the display portion 7000 with a finger, a stylus, or the like.

With the operation buttons 7103, power can be on or off. In addition, types of images displayed on the display portion 7000 can be switched; for example, switching from a mail creation screen to a main menu screen can be performed.

When a detection device such as a gyroscope sensor or an acceleration sensor is provided inside the mobile phone, the direction of display on the screen of the display portion 7000 can be automatically changed by determining the orientation of the mobile phone (whether the mobile phone is placed horizontally or vertically). Furthermore, the direction of display on the screen can be changed by touch on the display portion 7000, operation with the operation button 7103, sound input using the microphone 7106, or the like.

FIG. 23C illustrates an example of a portable information terminal. A portable information terminal 7210 illustrated in FIG. 23C includes a housing 7201 and the display portion 7000. The portable information terminal 7210 may also include an operation button, an external connection port, a speaker, a microphone, an antenna, a camera, a battery, or the like. The display portion 7000 is provided with a touch sensor. The operation of the portable information terminal can be performed by touching the display portion 7000 with a finger, a stylus, or the like.

The portable information terminal described in this embodiment functions as, for example, one or more of a telephone set, a notebook, and an information browsing system. Specifically, the portable information terminals each can be used as a smartphone. The portable information terminal illustrated in this embodiment is capable of executing, for example, a variety of applications such as mobile phone calls, e-mailing, reading and editing texts, music reproduction, Internet communication, and a computer game.

The portable information terminal 7210 can display characters, image information, and the like on its plurality of surfaces. For example, three operation buttons 7202 can be displayed on one surface, and information 7203 indicated by a rectangle can be displayed on another surface. FIG. 23C illustrates an example in which the operation buttons 7202 are displayed on the top surface of the portable information terminal 7210, and the information 7203 is displayed on the side surface of the portable information terminal 7210. Note that the operation buttons 7202 may be displayed on the side surface of the portable information terminal 7210 and the information 7203 may be displayed on the top surface of the portable information terminal 7210, for example. Information may be displayed on three or more surfaces of the portable information terminal 7210.

Examples of the information 7203 include notification from a social networking service (SNS), display indicating reception of an e-mail or an incoming call, the title of an e-mail or the like, the sender of an e-mail or the like, the date, the time, remaining battery, and the reception strength of an antenna. Alternatively, the operation button, an icon, or the like may be displayed instead of the information 7203.

Figure 23D:
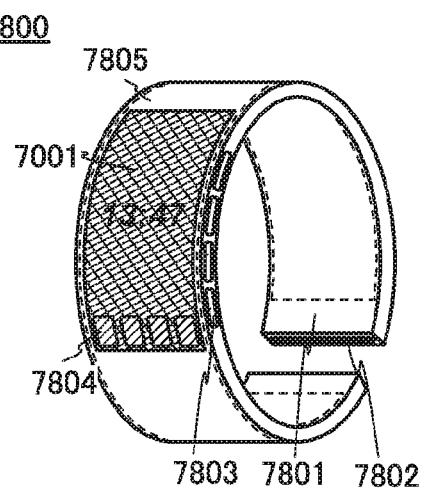
Figure 23E:
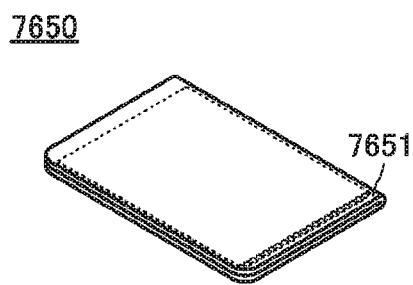
Figure 23F:
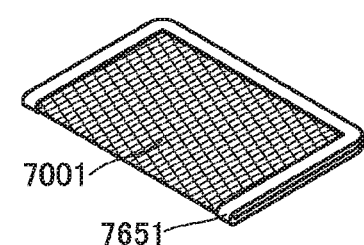

FIGS. 23D to 23F each illustrate an example of a portable information terminal including a flexible and bendable display portion 7001.

The flexible device that can be manufactured with one embodiment of the present invention can be used in the display portion 7001. For example, a flexible device that can be bent with a radius of curvature of greater than or equal to 0.01 mm and less than or equal to 150 mm can be used. The display portion 7001 may include a touch sensor so that the portable information terminal can be operated by touch on the display portion 7001 with a finger or the like. One embodiment of the present invention makes it possible to provide a highly reliable electronic device including a display portion having flexibility.

FIG. 23D illustrates an example of a wrist-watch-type portable information terminal. A portable information terminal 7800 includes a band 7801, the display portion 7001, an input/output terminal 7802, operation buttons 7803, and the like. The band 7801 functions as a housing. A flexible battery 7805 can be included in the portable information terminal 7800. The battery 7805 may be arranged to overlap with the display portion 7001, or the band 7801 and the like, for example.

The band 7801, the display portion 7001, and the battery 7805 have flexibility. Thus, the portable information terminal 7800 can be easily curved to have a desired shape.

With the operation buttons 7803, a variety of functions such as time setting, turning on or off of the power, turning on or off of wireless communication, setting and cancellation of silent mode, and setting and cancellation of power saving mode can be performed. For example, the functions of the operation buttons 7803 can be set freely by the operating system incorporated in the portable information terminal 7800.

By touch on an icon 7804 displayed on the display portion 7001 with a finger or the like, an application can be started.

The portable information terminal 7800 can employ near field communication conformable to a communication standard. For example, mutual communication between the portable information terminal and a headset capable of wireless communication can be performed, and thus hands-free calling is possible.

The portable information terminal 7800 may include the input/output terminal 7802. In the case where the input/output terminal 7802 is included in the portable information terminal 7800, data can be directly transmitted to and received from another information terminal via a connector. Charging through the input/output terminal 7802 is also possible. Note that charging of the portable information terminal described as an example in this embodiment can be performed by contactless power transmission without using the input/output terminal.

FIGS. 23E and 23F illustrate an example of a foldable portable information terminal. FIG. 23E illustrates a portable information terminal 7650 that is folded so that the display portion 7001 is on the inside. FIG. 23F illustrates the portable information terminal 7650 that is folded so that the display portion 7001 is on the outside. The portable information terminal 7650 includes the display portion 7001 and a non-display portion 7651. When the portable information terminal 7650 is not used, the portable information terminal 7650 is folded so that the display portion 7001 is on the inside, whereby the display portion 7001 can be prevented from being contaminated or damaged. Note that although FIGS. 23E and 23F illustrate an example of the portable information terminal 7650 that is folded in two, the portable information terminal 7650 may be folded in three, four, or more. The portable information terminal 7650 may include an operation button, an external connection port, a speaker, a microphone, an antenna, a camera, a battery, or the like.

This embodiment can be combined with any of other embodiments as appropriate.

This application is based on Japanese Patent Application serial no. 2016-088083 filed with Japan Patent Office on Apr. 26, 2016 and Japanese Patent Application serial no. 2016-088302 filed with Japan Patent Office on Apr. 26, 2016, the entire contents of which are hereby incorporated by reference.

What is claimed is:

1. A peeling method comprising:
   a first step of preparing a process member including a support substrate, a resin layer, an element layer, a first adhesive layer, and a counter substrate;
   a second step of irradiating the process member with light; and
   a third step of inserting a blade into the process member and peeling the support substrate from the process member,
   wherein in the first step, the resin layer is formed over the support substrate, openings are formed in the resin layer and positioned along two opposite sides of a periphery of the resin layer in a top view, the element layer is formed over the resin layer and positioned on an inner side than the openings in the top view, and the support substrate and the counter substrate are bonded to each other so that the first adhesive layer is in contact with the support substrate in the openings,
   wherein in the second step, the light is emitted from a laser light source, and the process member is irradiated with the light from the support substrate side, and
   wherein in the third step, the blade is inserted into an end portion of the process member from an interface between the support substrate and the resin layer or from the resin layer, and the blade is made to pass through the openings.

2. The peeling method according to claim 1, wherein the openings are positioned adjacent to two opposite long sides of the periphery of the resin layer in the top view.

3. The peeling method according to claim 1, wherein the resin layer comprises a photosensitive material.

4. The peeling method according to claim 1, wherein the resin layer has a thickness of greater than or equal to 0.1 μm and less than or equal to 3 μm.

5. The peeling method according to claim 1, wherein the element layer comprises a liquid crystal element or an organic EL element.

6. A method for manufacturing a flexible device, comprising the steps of:
   peeling the support substrate from the process member by the peeling method according to claim 5; and
   bonding a flexible substrate to the resin layer with a second resin layer positioned therebetween.

7. A peeling method comprising:
   a first step of preparing a process member including a support substrate, a resin layer, a first layer, an element layer, a first adhesive layer, and a counter substrate;
   a second step of irradiating the process member with light; and
   a third step of peeling the support substrate from the process member,
   wherein in the first step, the resin layer is formed over the support substrate, openings are formed in the resin layer and positioned along two opposite sides of a periphery of the resin layer in a top view, the element layer is formed over the resin layer and positioned on an inner side than the openings in the top view, the first layer is formed over the support substrate to cover the openings, and the support substrate and the counter substrate are bonded to each other so that the first adhesive layer is in contact with the first layer in the openings,
   wherein in the second step, the light is emitted from a laser light source, and the process member is irradiated with the light from the support substrate side, and
   wherein in the third step, the counter substrate is fixed to a stage, the support substrate is held by a plurality of suction pads, and the plurality of suction pads is lifted up, so that the support substrate is peeled from the process member.

8. The peeling method according to claim 7, wherein the first layer comprises indium tin oxide or In—Ga—Zn oxide.

9. The peeling method according to claim 7, wherein the resin layer comprises a photosensitive material.

10. The peeling method according to claim 7, wherein the resin layer has a thickness of greater than or equal to 0.1 μm and less than or equal to 3 μm.

11. The peeling method according to claim 7, wherein the element layer comprises a liquid crystal element or an organic EL element.

12. A method for manufacturing a flexible device, comprising the steps of:
   peeling the support substrate from the process member by the peeling method according to claim 11; and
   bonding a flexible substrate to the resin layer with a second resin layer positioned therebetween.

13. A peeling method comprising:
a first step of preparing a process member including a support substrate, a resin layer, an element layer, an adhesive layer, and a counter substrate;
a second step of irradiating the process member with light; and
a third step of inserting a blade into the process member and peeling the support substrate from the process member,
wherein in the first step, the resin layer is formed over the support substrate, the element layer is formed over the resin layer, and the counter substrate is positioned over the resin layer and the element layer with the adhesive layer positioned therebetween,
wherein the light in the second step is emitted from a laser light source,
wherein the process member is irradiated with the light from the support substrate side in the second step,
wherein a first surface of the process member except regions along two opposite sides of a periphery of the process member in a top view is irradiated with the light in the second step, and
wherein in the third step, the blade is inserted into an end portion of the process member from an interface between the support substrate and the resin layer or from a side surface of the resin layer, and the blade is made to pass through the regions.

14. The peeling method according to claim 13, wherein the resin layer comprises a photosensitive material.

15. The peeling method according to claim 13, wherein the resin layer has a thickness of greater than or equal to 0.1 µm and less than or equal to 3 µm.

16. The peeling method according to claim 13, wherein the element layer comprises a liquid crystal element or an organic EL element.

17. A method for manufacturing a flexible device, comprising the steps of:
peeling the support substrate from the process member by the peeling method according to claim 16; and
bonding a flexible substrate to the resin layer with a second resin layer positioned therebetween.

18. A peeling method comprising:
a first step of preparing a process member including a support substrate, a resin layer, an element layer, an adhesive layer, and a counter substrate;
a second step of irradiating the process member with light; and
a third step of inserting a blade into the process member and peeling the support substrate from the process member,
wherein in the first step, the resin layer is formed over the support substrate, the element layer is formed over the resin layer, and the counter substrate is positioned over the resin layer and the element layer with the adhesive layer positioned therebetween,
wherein in the second step, a light-blocking film is provided over the support substrate, the light-blocking film covers regions along two opposite sides of a periphery of the support substrate in a top view, the light is emitted from a laser light source, and the process member is irradiated with the light from the support substrate side, and
wherein in the third step, the blade is inserted into an end portion of the process member from an interface between the support substrate and the resin layer or from a side surface of the resin layer, and the blade is made to pass through the regions.

19. The peeling method according to claim 18, wherein the light-blocking film provided in the second step covers the periphery of the support substrate except end portions of the two opposite sides in the top view.

20. The peeling method according to claim 18 wherein the resin layer comprises a photosensitive material.

21. The peeling method according to claim 18, wherein the resin layer has a thickness of greater than or equal to 0.1 µm and less than or equal to 3 µm.

22. The peeling method according to claim 18, wherein the element layer comprises a liquid crystal element or an organic EL element.

23. A method for manufacturing a flexible device, comprising the steps of:
peeling the support substrate from the process member by the peeling method according to claim 22; and
bonding a flexible substrate to the resin layer with a second resin layer positioned therebetween.

* * * * *